US012795017B2

(12) United States Patent
Singla et al.

(10) Patent No.: US 12,795,017 B2
(45) Date of Patent: Nov. 10, 2026

(54) INTERFACE AND SYSTEMS FOR PREDICTIVE INTERACTIONS AND CONTACT SORTATION

(71) Applicant: Integrity, LLC, Dallas, TX (US)

(72) Inventors: Harsh Singla, Dallas, TX (US); Eric Wade, Dallas, TX (US)

(73) Assignee: Integrity, LLC

( * ) Notice: Subject to any disclaimer, the term of this patent is extended or adjusted under 35 U.S.C. 154(b) by 127 days.

(21) Appl. No.: 18/891,938

(22) Filed: Sep. 20, 2024

(65) Prior Publication Data

US 2025/0106320 A1 Mar. 27, 2025

Related U.S. Application Data

(60) Provisional application No. 63/584,742, filed on Sep. 22, 2023.

(51) Int. Cl.
*H04M 1/72484* (2021.01)
*H04M 1/72472* (2021.01)

(52) U.S. Cl.
CPC ... *H04M 1/72484* (2021.01); *H04M 1/72472* (2021.01)

(58) Field of Classification Search
CPC ...................... H04M 1/72472; H04M 1/72484
USPC ... 455/552.1, 466, 569.2, 404.1, 414.1, 521, 455/518, 418, 411, 413, 509
See application file for complete search history.

(56) References Cited

U.S. PATENT DOCUMENTS

| | | | |
|---|---|---|---|
| 8,571,900 | B2 | 10/2013 | Belhe et al. |
| 8,666,788 | B1 | 3/2014 | Syed |
| 8,694,342 | B2 | 4/2014 | Burton et al. |
| 8,775,221 | B2 | 7/2014 | Feldman et al. |
| 9,049,314 | B2 | 6/2015 | Pugh et al. |
| 9,467,542 | B1 | 10/2016 | Messenger et al. |
| RE46,478 | E | 7/2017 | Rodenbusch et al. |
| 10,650,413 | B2 | 5/2020 | Black et al. |
| 11,494,410 | B2 | 11/2022 | Kuruganti et al. |
| 12,045,293 | B2 | 7/2024 | Taylor et al. |
| 2002/0049617 | A1 | 4/2002 | Lencki et al. |
| 2004/0143464 | A1 | 7/2004 | Houle et al. |
| 2004/0143473 | A1 | 7/2004 | Tivey |
| 2004/0186750 | A1 | 9/2004 | Surbey et al. |
| 2006/0064313 | A1 | 3/2006 | Steinbarth et al. |

(Continued)

FOREIGN PATENT DOCUMENTS

| | | | |
|---|---|---|---|
| WO | WO 2006/023752 | A2 | 3/2006 |
| WO | WO 2023/086523 | A2 | 5/2023 |

OTHER PUBLICATIONS

Help.Calendly.com [online], "Assign leads to a specific Salesforce user," Jan. 20, 2022, retrieved on Jan. 4, 2023, retrieved from URL<https://help.calendly.com/hc/en-us/articles/360053862794-Assign-leads-to-a-specific-Salesforce-user#assign-leads-to-a-specific-salesforce-user-0-0>, 5 pages.

(Continued)

*Primary Examiner* — Joseph Arevalo
(74) *Attorney, Agent, or Firm* — Fish & Richardson P.C.

(57) ABSTRACT

The document generally describes systems and methods that can identify and sort contacts in an improved manner based upon a predictive model. Optionally, the systems and methods described herein can achieve an improved mobile interface (e.g., mobile phone) that rapidly sorts a predicted subset of contacts on a small form factor interface.

20 Claims, 17 Drawing Sheets

(56) References Cited

U.S. PATENT DOCUMENTS

| | | | | |
|---|---|---|---|---|
| 2008/0126951 | A1* | 5/2008 | Sood | H04L 51/226<br>715/752 |
| 2009/0089086 | A1 | 4/2009 | Schoenberg | |
| 2010/0223078 | A1 | 9/2010 | Willis et al. | |
| 2011/0016056 | A1 | 1/2011 | Hargroder | |
| 2012/0158465 | A1 | 6/2012 | Golembiewski | |
| 2012/0215552 | A1 | 8/2012 | Goldschmidt | |
| 2013/0085785 | A1 | 4/2013 | Rogers et al. | |
| 2014/0059431 | A1 | 2/2014 | Svendsen et al. | |
| 2014/0081688 | A1 | 3/2014 | Kotak et al. | |
| 2016/0155181 | A1 | 6/2016 | Romaya et al. | |
| 2016/0371724 | A1 | 12/2016 | Kulpa et al. | |
| 2019/0052584 | A1 | 2/2019 | Barve et al. | |
| 2019/0096018 | A1 | 3/2019 | Stueckmann et al. | |
| 2019/0125457 | A1* | 5/2019 | Parihar | A61B 17/0206 |
| 2019/0206565 | A1* | 7/2019 | Shelton, IV | A61B 90/90 |
| 2020/0012414 | A1 | 1/2020 | Bowen | |
| 2020/0219163 | A1 | 7/2020 | Kumar | |
| 2022/0292609 | A1 | 9/2022 | Fasoli et al. | |
| 2022/0406452 | A1* | 12/2022 | Shelton, IV | A61B 17/02 |
| 2023/0103360 | A1 | 4/2023 | Singla et al. | |
| 2023/0124427 | A1 | 4/2023 | Taylor et al. | |
| 2023/0177855 | A1* | 6/2023 | Singh | G06V 20/62<br>382/176 |
| 2023/0334409 | A1 | 10/2023 | Lundstrom et al. | |
| 2024/0080390 | A1 | 3/2024 | Singla et al. | |
| 2024/0095847 | A1 | 3/2024 | Singla et al. | |
| 2024/0370501 | A1 | 11/2024 | Taylor et al. | |

OTHER PUBLICATIONS

IntegrityMarketing.com [online], "Announcing the New Medicare Center," Sep. 4, 2020, retrieved on May 12, 2022, retrieved from URL<https://www.integritymarketing.com/announcing-our-new-medicarecenter/>, 4 pages.

Mays, [online] "Assign leads to your sales reps," Nutshell.com, Feb. 9, 2022, retrieved on Jan. 4, 2023, retrieved from URL<https://support.nutshell.com/hc/en-us/articles/115014626128-Assign-leads-to-your-sales-reps>, 8 pages.

Newhorizonsmktg.com [online], Agent Tips: How to Use Switcher Tags to Retain Your Clients, Oct. 25, 2022, retrieved on Dec. 7, 2023, retrieved from URL <https://www.newhorizonsmktg.com/announcements/agent-tips-how-to-use-switcher-tags-to-retain-your-clients>, 3 pages.

* cited by examiner

INTERFACE AND SYSTEMS FOR PREDICTIVE INTERACTIONS AND CONTACT SORTATION

CROSS-REFERENCE TO RELATED APPLICATIONS

This application claims benefit of U.S. Provisional Patent Applications Nos. 63/584,742 filed on Sep. 22, 2023, the contents of which are hereby incorporated by reference herein in its entirety.

TECHNICAL FIELD

This document describes computer systems, user interfaces, and computer-implemented methods for presenting interface elements that indicate multiple aspects of notifications.

BACKGROUND

A computing device sometimes receives or generates notifications for presentation to a user of the computing device. Such presented notifications can indicate to the user, for example, the receipt of messages, completion of computing activities, and determination that criteria of computing algorithms have been fulfilled. Computing device presentation of such notifications can include displaying a list of notifications that fills a user display, and which requires user input to scroll the list to view the entire list of notifications and determine various aspects of the notifications.

SUMMARY

Some embodiments herein include computer systems and methods that present interface elements that indicate multiple aspects of notifications. As an example, a computing system can generate multiple notifications for presentation to a user of a computing device and assign different priority levels to the notifications (e.g., high, medium, and low). The computing system can send information to the computing device to cause the computing device to display interface elements that summarize aspects of the multiple notifications. For example, the computing device can display the summarizing interface elements to the user in a first screen to provide the user with an overview of the notifications without presenting the actual notifications. The summarizing interface elements may be user selectable to cause navigation to a second screen that presents the notifications.

The summarizing interface elements presented on the first screen can include a single interface element presented in a style that indicates a priority level of a highest-priority notification of the multiple notifications, accompanied by a number that indicates a quantity of the multiple notifications. For example, the computing device may present a yellow-colored interface element accompanied by the number "5" in superscript, to indicate the presence of five notifications that have a highest priority level of "medium" (e.g., with red corresponding to a highest priority and green corresponding to a lowest priority).

User selection of the yellow-colored interface element may cause navigation to a different screen for presentation of the multiple notifications. The different screen may present each notification as a message (e.g., "Reminder to call Jim by Tuesday"), with each notification accompanied by an instance of the above-described summarizing interface element to indicate a priority of the corresponding notification. For example, each notification that is assigned a "medium" priority level may be accompanied by a yellow-colored interface element, while each notification that is assigned a "low" priority level may be accompanied by a green-colored interface element. The computing device may present the notifications in order of assigned priority, rather than in order of notification receipt/creation/storage.

The devices, system, and techniques described herein may provide one or more of the following advantages. A computing device may present more information regarding notifications on a screen than if the device simply presented the notifications, particularly for multiple groups of notifications. The computing device may present summarized notification information for each user contact in a contact list presented by the computing device, which enables a user of the computing device to quickly determine which group of notifications to view from among multiple groups of notifications. In examples in which the computing system stores multiple groups of notifications for each user contact in the contact list (e.g., due to each group of notifications being a different type of notification), the computing device may present separate summarized notification information for each group of notifications (e.g., first summarized notification information for a first group of reminder-type notifications for a particular user contact, and second summarized notification information for a second group of alert-type notifications for the particular user contact). As such, the computing device can present several summarizing interface elements in a contact list, with each summarizing interface element indicating aspects of a single group of notifications and being user selectable to cause the computing device to navigate to a display of the respective, single group of notifications.

Some implementations of the disclosed system present an improved user interface that identifies and presents user contacts based on a predictive model (e.g., via results obtained from a machine-learning model, a neural network model, or a statistical-weighted model based on historic user data) in a prioritized manner. Particularly in implementations with limited screen space, such as mobile devices, the technological solutions described herein can improve user experience on a small form factor interface. By accurately identifying which user contacts are likely in need of imminent attention, the disclosed predictive model increases the likelihood of a user viewing prioritized notifications.

Methods and systems disclosed include operations and processes including receiving, by a computing system, a request from a user device to present information regarding a first user contact; identifying, by the computing system, multiple notifications generated for the first user contact, each notification of the multiple notifications assigned a priority level for the respective notification from a collection of different priority levels for notifications; determining, by the computing system, a prioritized notification from among the multiple notifications generated for the first user contact, based on the priority level assigned to the prioritized notification having a highest priority level from among the priority levels assigned to the multiple notifications; identifying, by the computing system, a quantity of the multiple notifications that have been generated for the first user contact; providing, by the computing system responsive to the computing system receiving the request from the user device to present information regarding the first user contact, data to cause the user device to display a user interface that presents: (i) a name of the first user contact; (iii) a selectable element presented in a first state that indicates the status level of the prioritized notification, and that is accompanied by an indication of the quantity of the multiple notifications that have been generated for the first user contact; providing, by the computing system, data to cause the user device to present the multiple notifications generated for the first user contact in a second user interface, responsive to the user device receiving user input that selects the selectable element, the second user interface presenting a list the notifications that includes: i) the prioritized notification at a beginning of the list of notifications, as a result of the prioritized notification having been determined by the computing system to have the highest priority level from among the priority levels assigned to the multiple notifications; and (ii) other notifications of the multiple notifications following the prioritized notification.

Additional features can include, in some instances:

The presentation of the selectable element in the first state comprises presenting the selectable element with a first color; and the computing system is configured to provide data to cause the user device to present the selectable element with a second color instead of the first color, responsive to the computing system determining that prioritized notification has a different priority level from among the priority levels assigned to the multiple notifications.

The presentation of the indication of the quantity of the multiple notifications comprises presenting a number that is smaller than the selectable element next to the selectable element, the number corresponding to the quantity of the multiple notifications.

The presentation of the indication of the quantity of the multiple notifications comprises presenting a subscript or superscript number that corresponds to the quantity of the multiple notifications.

The request from the user device comprises a request for a contact list; the first user interface comprises the contact list, with the contact list concurrently presenting: (a) the name of the user contact, the selectable element that is presented in the first state, and the indication of the quantity of the multiple notifications that have been generated for the first user contact; and (b) a name of a second user contact, a second selectable element that is presented in a second state that indicates a status level of a second prioritized notification generated for the second user contact, and an indication of a second quantity of second multiple notifications that have been generated for the second user contact.

In some instances, the presentation of the selectable element in the first state includes presenting the selectable element with a first color; the presentation of the second selectable element in the second state includes presenting the second selectable element with a second color; the presentation of the indication of the quantity of the multiple notifications includes presenting a subscript or superscript number that corresponds to the quantity of the multiple notifications; and the presentation of the indication of the second quantity of the second multiple notifications includes presenting a subscript or superscript number that corresponds to the second quantity of the second multiple notifications.

In some instances, the contact list further concurrently presents, along with the information listed for the user contact and the second user contact: (c) a name of a third user contact, accompanied with an absence of any selectable element at a location relative to the name of the third user contact that corresponds to locations of the selectable element and the second selectable element relative to the name of the user contact and the second user contact.

In some instances, the contact list concurrently presents: (a) a first selectable reminder element that is presented with a first design that indicates a first level of urgency of a first reminder to contact the first user contact; (b) a second selectable reminder element that is presented with a second design that indicates a second level of urgency of a second reminder to contact the second user contact.

In some instances, the first selectable reminder element and the second selectable reminder element have a same first shape; and the selectable element and the second selectable element have a same second shape that differs from the same first shape.

In some instances, presenting the first selectable reminder element with the first design that indicates the first level of urgency includes presenting the first selectable reminder element with a first color; presenting the second selectable reminder element with the second design that indicates the second level of urgency includes presenting the second selectable reminder element with a second color; the first selectable reminder element is accompanied in the contact list by an indication of a quantity of first multiple reminders to contact the first individual specified by the first user account; and the second selectable reminder is accompanied in the contact list by an indication of a quantity of second multiple reminders to contact the second individual specified by the second user account.

In some instances, the second user interface comprises a pop-up box presented over the first user interface.

In some instances, the list of notifications presented by the second user interface includes: (a) the prioritized notification accompanied by a graphical element presented in the first state that indicates the status level of the prioritized notification; and (b) a second notification of the multiple notifications accompanied by the graphical element presented in a second state that indicates the status level of the second notification.

In some instances, the process or operations include: presenting the graphical element in the first state comprises presenting the graphical element with a first color; and presenting the graphical element in the second state comprises presenting the graphical element with a second color.

In some instances, the process or operations include: presenting the prioritized notification in the second user interface includes presenting text that provides a title for the prioritized notification and text that provides a description for the prioritized notification and that is smaller than the text that provides the title for the prioritized notification; and presenting the second notification in the second user interface includes presenting text that provides a title for the second notification and text that provides a description for the second notification and that is smaller than the text that provides the title for the second notification.

In some instances, the process or operations include: the second user interface presents a name of the first user contact and a second selectable element that is user selectable to cause the user device to navigate from presenting the second user interface to presenting a contact record for the first user contact.

In some instances, the process or operations include: presenting the prioritized notification in the second user interface includes presenting: (i) text indicating that a plan in which the first user contact is enrolled is or will no longer be available; and (ii) a second selectable element that is user selectable to cause the computing device to navigate from presenting the second user interface to presenting an interface to initiate a search for plans that are available for the first user contact.

In some instances, the prioritized notification has the highest priority level from among the priority levels assigned to the multiple notifications despite the prioritized notification be generated for the first user contact after at least one of the multiple notifications and before at least another of the multiple notifications, such that the prioritized notification is associated with neither a earliest date or most recent date from dates associated with the multiple notifications.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to technology for presenting notification-summarizing interface elements that indicate multiple aspects of notifications. A computing device that is adapted to present such notifications may present the notification-summarizing interface elements on a screen that does not otherwise present notifications, to present a user viewing the screen with information regarding multiple distinct groups of notifications. Each of the notification-summarizing interface elements is user selectable to cause navigation to the corresponding group of notifications, to facilitate user interaction with a subset of notifications that are most relevant to the user at a given point in time. As such, the computing device may present a graphical user interface that intelligently organizes and prioritizes notifications and notification-summarizing interface elements on different screens, enabling a user to quickly and readily digest complex information generated for a large number of user contacts.

Figure 1:
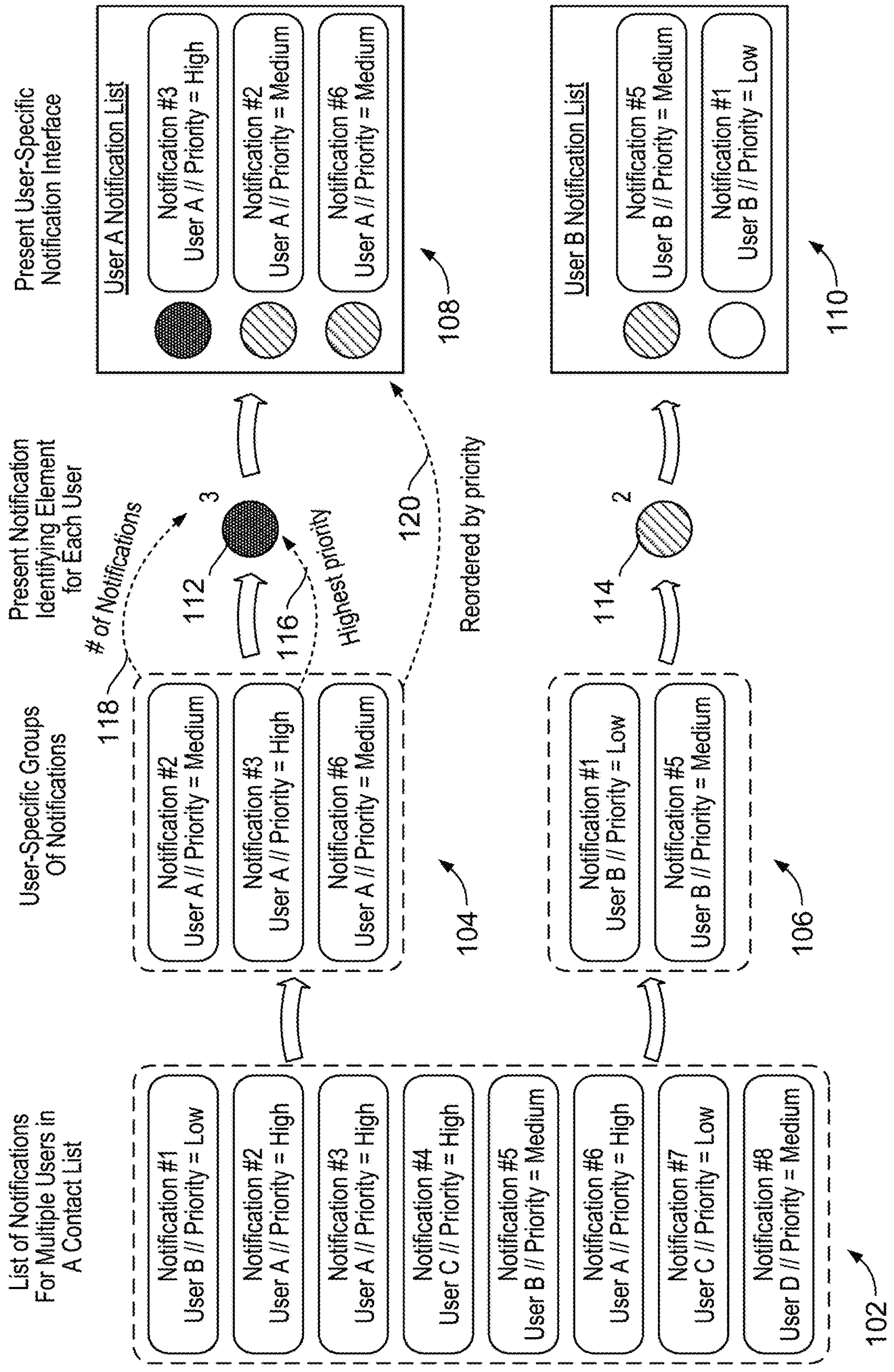
FIG. 1 illustrates an example process for presenting interface elements that indicate multiple aspects of notifications.

FIG. 1 conceptually illustrates an example process for presenting interface elements that indicate multiple aspects of notifications. In general, a computing system can store information for a large number of user contacts, with each user contact being assigned its own unique properties and parameters. The computing system may generate notifications for each user contact, such that the system may store many such notifications for presentation to a particular computing device user to which the user contacts are assigned. Indeed, the user contacts may be contacts specific to the particular computing device user such that another user of the computing system may be assigned a different set of user contacts.

A difficulty with a system that generates notifications for multiple user contacts is that the particular computing device user may have difficulty reviewing all such notifications. For example, the particular computing device user may need to either review all such notifications or identify a mechanism to prioritize which notifications for which user contacts to review, based on a multi-dimensional analysis. FIG. 1 illustrates how the technology described in this disclosure is able to generate user interface content that facilitates user interaction with notifications.

FIG. 1 shows a list of notifications 102 for multiple users in a contact list. A notification can represent content to be shown to a computing device user that is able to view the contact list (e.g., a user of a computer program that presents the contact list and allows the user to edit the contact list). Each notification can include text to be presented to the computing device user. In some examples, notifications indicate that action may need to be taken regarding a particular user contact. As such, each notification may be assigned a single user contact. This is illustrated in FIG. 1 with the text "User A", "User B", "User C", and "User D". The user contact to which each notification is assigned may be represented by code (e.g., "user1078") when the user contact is stored in memory, although the user contact may be represented by typed text (e.g., "John Doe") when the notification is presented on a display device. The notifications can represent alerts or reminders, as some example types of notifications.

Each notification in the list of notifications 102 shown in FIG. 1 includes a name with a sequence number, such as "Notification #1", "Notification #2", and "Notification #3". The notification names are exemplary and notifications may have other, more descriptive names. Regardless, notifications may include information that encodes a numerical sequence of the notifications, as indicated by the sequence number that ends each notification name in FIG. 1. The sequence number of each notification indicates an ordering of the notifications, with the ordering being based on time (e.g., a time of creation or receipt). The notifications can be generated in response to trigger events, or event handlers within the computing system. The notifications can form in a queue or log based on the time of the event, a time of generation, or a time stored by the notification. Each notification may include information that indicates the notification's respective time.

Each notification can include a priority level (e.g., high/medium/low, or a numerical priority indicator such as a number in a range between 0 and 100). The priority level can indicate an importance or urgency of information contained within the respective notification (e.g., a time-critical nature of a reminder). Each notification can include stored information that indicates the triggering event that resulted in creation of the notification, such as a timer expiration, a condition or criteria that was satisfied, or user action or inaction.

FIG. 1 shows how the list of notifications 102 can be filtered to identify user-specific groups of notifications 104 and 106. The notifications in groups 104 and 106 are the same as the notifications from the list 102, but limited to notifications for a specific user-"User A" for the notifications in group 104 and "User B" for the notifications in group 106. Accordingly, the computing system can interact with notifications stored in memory, so that the notifications can be sorted or filtered by user contact. In this manner, a consolidated list of all notifications applicable to any particular user contact is created. Although not shown in FIG. 1, there may be multiple different types of notifications, and the filtering process can isolate groups of notifications that are not only specific to a particular user contact, but also of a specific notification type.

Based on the content of each user-specific group of notifications 104 and 106, the computing system presents notification-identifying elements 112 and 114. The notification-identifying elements 112 and 114 may be presented in association with entries for user contacts in a contact list, as described in additional detail below with reference to at least FIG. 2.

The notification-identifying elements 112 and 114 represent different states of the same notification-identifying icon element, with the different states indicating different priority levels. For example, notification-identifying element 112 is presented fully-shaded to indicate a high priority level, and notification-identifying element 114 is presented with a slashed-line pattern to indicate a medium priority level. As indicated by dashed arrow 116, the computing system can select a state for a notification-identifying icon element as corresponding to (e.g., matching) a highest-priority level identified from among a group of notifications that are specific to a user contact. States of a notification-identifying icon element can take the form of, for example, different patterns for the icon element, different colors for the icon, and different shapes of the icon element. For example, a red notification-identifying element can indicate presence of a high-priority notification for the associated user contact, while a yellow notification-identifying element can indicate presence of an intermediate priority notification for the associated user contact. Blue or green can indicate presence of a low-priority notification for the associated user contact.

Each of the notification-identifying elements 112 and 114 is accompanied by a superscript number that corresponds to the quantity of notifications in the corresponding user-specific group of notifications 104 and 106, as illustrated by arrow 118. As such, each notification-identifying element indicates multiple aspects of the notifications stored for the corresponding user contact (e.g., due to the notification-identifying element being accompanied by a superscript number). In some implementations, rather than a superscript number, a computing device presents a different type of indication of the quantity of notifications specific to the relevant user contact, such as a number attached to the notification-identifying element, a subscript number, or a number inlaid within the notification-identifying element itself.

User selection of the notification-identifying elements 112 and 114 (e.g., due to user input tapping a location at which the elements 112 and 114 are displayed on a touchscreen that is presenting a contact list), causes the display to navigate from presenting a contact list for multiple users to presenting a user-specific notification list. For example, user selection of element 112 causes navigation to a screen that presents the User A notification interface 108, while user selection of element 114 causes navigation to a screen that presents the User B notification interface 110. The user-specific notification interfaces 108 and 110 may be presented as a modal window, a pop-up box, or a new page, and can list the notifications associated with the selected user, their relative priorities, and other information such as the triggering event or recommended actions to take.

The notification interfaces 108 and 110 illustrate how each notification is accompanied by a notification-identifying icon element in one of three states: fully-shaded to indicate high-priority notifications (as with Notification #3); patterned with slanted lines to indicate medium-priority notifications (as with Notifications #2, #6, and #5); and empty to indicate low-priority notifications (as with Notification #1). A selected notification-identifying element (e.g., element 112) may have a same appearance as a subsequently-displayed notification-identifying element that accompanies a highest-priority notification in a subsequently-viewed user-specific notification interface (e.g., the element that accompanies Notification #3 in the user-specific notification interface 108).

Figure 3:
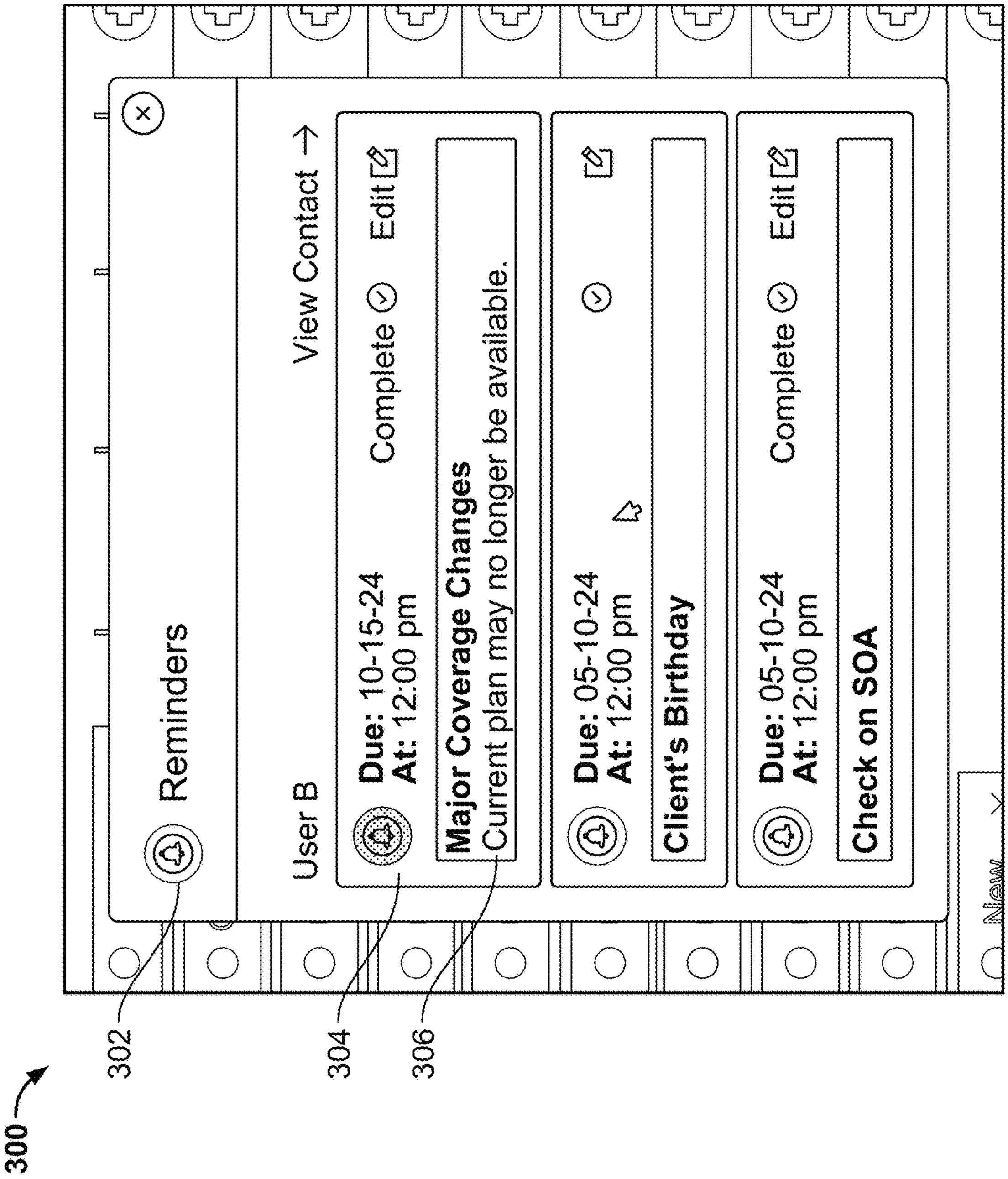
FIG. 3 illustrates an example GUI showing a reminder notification window.
Figure 4:
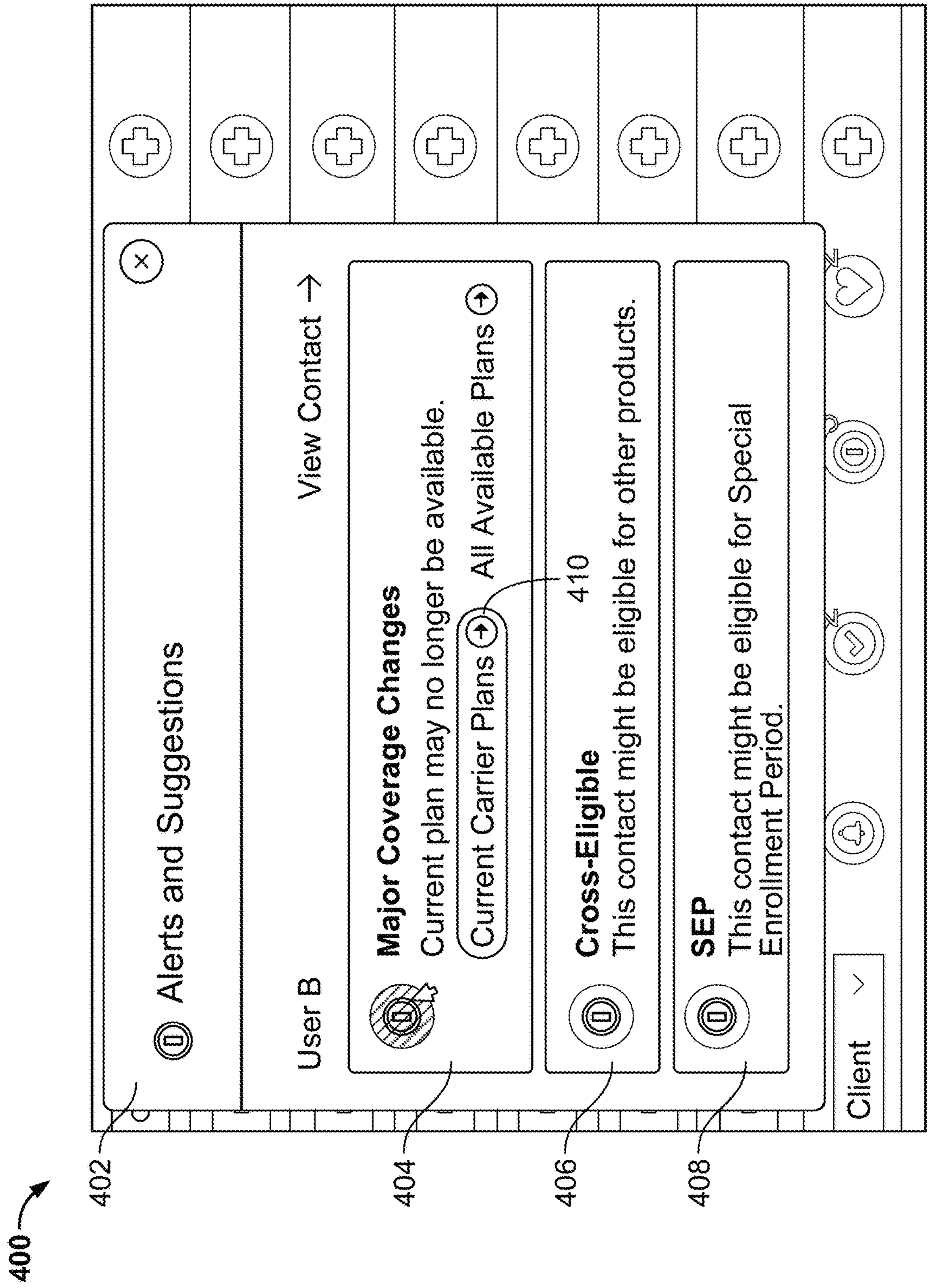
FIG. 4 illustrates an example GUI showing an alert notification window.

The notifications shown in each of the notification interfaces 108 and 110 are illustrated as only showing the name of the notification, although the display of these notifications may present additional information, as discussed further with respect to at least FIGS. 3 and 4.

As illustrated by dashed arrow 120, the notifications in interfaces 108 and 110 are ordered by priority, for example, rather than ordering by sequence or a date associated with each respective notification. The presentation of notifications ordered by priority (e.g., with highest notification at top, medium below, and low even further below) may be an initial presentation of the notifications upon the relevant display devices transitioning from presenting selectable elements 112 and 114 in a contact list to presenting either of the notification interfaces 108 and 110. In some examples, the notifications in interfaces 108 and 110 cannot be reordered by a viewing user, such that the presented order by priority is a default state of presentation.

Figure 2:
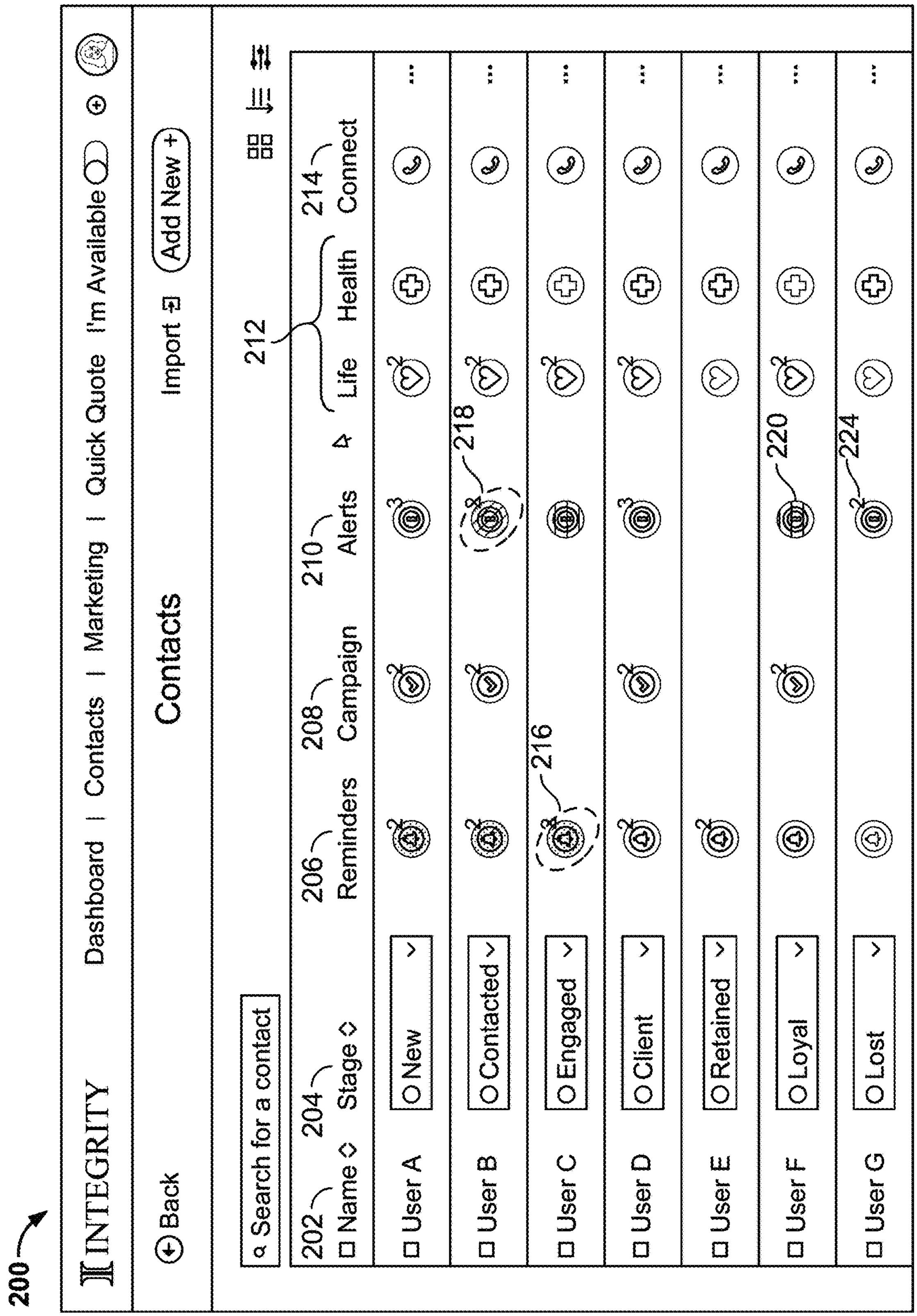
FIG. 2 illustrates an example GUI showing interface elements that indicate multiple aspects of notifications.

FIG. 2 illustrates an example GUI 200 showing interface elements that indicate multiple aspects of notifications. The GUI 200 is shown in a table format, with a first column 202 for the names of user contacts, a second column 204 for the status or stage of user contacts, a third column 206 for reminder-type notification-identifying elements, a fourth column 208 for campaign-indicating elements (e.g., indicating one or more sources of the respective user contact), a fifth column 210 for alert-type notification-identifying elements, sixth and seventh columns 212 for elements that indicate a quantity of life and health products in which the user contacts are enrolled, and an eighth column 214 for connect elements that are user selectable to initiate communication with an individual identified by a user contact. Each user contact in the contact list can have information populated in a row that corresponds to the user contact, in some or all of the columns, and this information can populate automatically, manually, or both.

The contact list in GUI 200 can be sorted by column. For example, a computing device user that is viewing the GUI 200 can select the "Stage" element atop the second column 204 to sort the user contacts by stage 204 (e.g., with second-order sorting by user contact name if the stages match). In some examples, the computing device user can interact with columns of notification-identifying elements (e.g., by selecting the text atop columns 206 and/or 210) to sort the contact list in GUI 200 based on the priority and quantity of notifications in column 210 (e.g., sorting by priority, with second-order sorting by number of notifications if the priorities match).

The selectable elements in the stage column 204 can indicate a status for each user contact in the contact list of GUI 200. In some implementations, the stage of each user contact can be updated manually by the computing-device user that is viewing the contact list, for example, as a result of user interaction with the drop-down menu shown for each user contact in the stage column 204. In some implementations, the computing system automatically updates the stage to which each user contact is assigned, although subsequent modification by the computing-device user is permitted. For example, when the computing system determines that a user contact in the contact list has purchased a product, the element listed in the stage column 204 for the corresponding user contact can automatically shift from “retained” to “engaged” or “new”.

The elements in the campaign column 208 can indicate how the corresponding user contacts in the contact list were first contacted. Presence of an element in the campaign column 208 can indicate that the corresponding user contact was generated as a result of a campaign, with the superscript number indicating a number of campaigns with which the user contact was engaged. User selection of an element in the campaign column 208 can result in the user interface navigating to a different screen that shows additional information regarding such campaigns.

The elements in the product columns 212 can indicate a quantity of products in which the corresponding user contacts are enrolled. In the illustrated example, the example products include user health plans and user life plans. If a user contact is determined to include a health plan, the system can present a colored icon in the “life” column, with a superscript number indicating a quantity of such life plans. Similarly, if a user contact is determined to include a health plan, the system can present a colored icon in the “health” column, with a superscript number indicating a quantity of such health plans. The system can present a black and white icon for a user contact in the product columns 212 as a result of determining that the user contact is not assigned a corresponding life or health plan.

Elements in the connect column 214 may be user selectable to initiate communication with corresponding user contacts. For example, if the computing-device user that is viewing the contact list of GUI 200 selects an element for a particular user contact in the connect column 214, the computing device at which the computing-device user is viewing the GUI 200 can connect the computing device using a VOIP protocol to a phone number associated with the corresponding user contact. In another example, selecting the element may cause the computing device to generate a draft email with the user’s email address pre-populated. In some implementations, user selection of an element in the connect column 214 results in the computing device presenting a modal window or pop-up window which enables the computing-device user operator to select the appropriate contact method, such as telephone, email, SMS, web message, or physical mail.

Notification-identifying elements in the reminders column 206 can indicate whether the computing system has stored notifications indicating presence of corresponding reminders for each user contact. The elements in column 206 are examples of the notification-identifying elements described above with reference to FIG. 1, with each such element in column 206 being color coded to indicate a priority of a highest-priority reminder stored for the corresponding user contact. A superscript number that accompanies each notification-identifying element in column 206 indicates a number of reminder-specific notifications for the corresponding user contact (with no superscript number indicating that the system has identified that a single reminder-specific notification is stored for the user contact). User selection of a notification-identifying element in column 206 (e.g., element 216) causes the computing device presenting GUI 200 to navigate to a presentation of the corresponding reminder notifications, as shown in FIG. 3.

FIG. 3 illustrates an example GUI 300 showing a reminder notification window. The reminder notification window shows the reminder notifications that are specific to a particular user contact, and which provide detailed information regarding the reminder notifications. Each reminder notification can be listed on a separate row or in a separate box 304. Each reminder notification can indicate deadline information associated with the corresponding notification (e.g., due date/time). Each reminder notification can include additional details 306, such as a reason for the reminder notification (e.g., user birthday, paperwork deadline, or product expiration). Each reminder notification can provide a link or additional interactive GUI elements (306) to enable the operator to address the reminder.

In some implementations, each reminder notification includes one or more other buttons, selectable icons, toggles, or links, such as a “complete” button, which can be user selectable to indicate that a task associated with the reminder notification has been completed and that the reminder notification can be removed from the list of reminder notifications. The reminder notifications in the reminder notification window can each be accompanied by a reminder-notification icon element presented in a state that indicates a priority of the corresponding reminder notification. For example, a red notification element can indicate a highest-priority reminder notification due to the reminder notification being past due, while a light blue notification element can indicate that the reminder notification is due within two weeks. Dark blue can indicate that a corresponding reminder notification is due within one week. In some implementations, the reminder-notification icon can differ depending on whether the reminder was manually input or automatically generated (e.g., in association with a notification or alert as described below).

Returning to FIG. 2, the alert notifications column 210 includes notification-identifying elements that indicate presence of alert notifications that were generated by a predictive model to indicate events requiring attention of a computer user viewing the contact list FIG. 2. Each notification-identifying element in column 210 (e.g., notification-identifying element 220) can be color coded to indicate a priority level of a highest-ranked alert notification stored by the computing system for the corresponding user. Each such element 220 can be accompanied by an indication of the quantity of alert notifications, such as superscript 224. In the illustrated example, User B’s notification-identification is presented with a state (e.g., slashed lines) that indicates the highest level of priority, with a superscript “3” indicating that there are three alert notifications for User B. Absence of a notification-identifying element for a user contact in column 210 can indicate that there are no alert notifications stored for the corresponding user account. Presence of a notification-identifying element but without a superscript number can indicate that there is a single alert notification stored for the corresponding user account. The combination of the slashed-line notification-identification element with a superscript "3" indicates that that the computing system has stored three alert notifications for the user contact Robert Christiansen, and at least one is of the highest priority. If the computing device user that is viewing the contact list of FIG. 2 selects element 218, the computing device can transition to presenting a new GUI, as described below with respect to FIG. 4.

FIG. 4 illustrates an example GUI showing an alert notification window 400. The computing device at which a user has viewed the contact list of FIG. 2 may present window 400 as a pop-up or modal window on top of GUI 200, or a screen presenting window 400 can replace the presentation of the contact list of FIG. 2 entirely. The content of information of window 400 may be newly-presented upon user selection of element 218. In some implementations, the alert notification window 400 includes a title bar 402 that provides the computing device user with context regarding a type of the notification presented in the notification window 400. In the illustrated example, window 400 shows three notifications, each occupying a separate row or box within window 400.

The three alert notifications shown in FIG. 4 include: (1) a plan change notification 404 accompanied with a notification-identifying element presented in a state to indicate a highest priority level (e.g., slashed or colored); (2) a cross-eligible notification 406 accompanied with a notification-identifying element presented in a state indicating a medium priority level; and (3) a special enrollment period notification 408 accompanied with a notification-identifying element also presented in the state indicating the medium priority level. The cross-eligible notification 406 may indicate that the user contact to which the notification in window 400 relate may be eligible for additional products. The special enrollment period notification 408 may indicate that the relevant user contact is currently within a special enrollment period able to change plans. Each notification can be shown as including additional descriptive text that indicates why the notification was triggered, and/or that otherwise provides information regarding the notification.

Each notification presented in alert notification window 400 may include additional interface elements. For example, notification 404 includes selectable button element 410, which is adapted to cause device navigation to a presentation of a list of available products that are suitable to replace a product in which the corresponding user contact is current enrolled (e.g., and which is soon expiring, causing the system to generate notification 404). User selection of the "X" element in the top-right corner of the alert notification window 400 may cause the window 400 to disappear and the user interface to transition back to displaying the contact list shown in FIG. 2 (e.g., with all or a portion of the contact list having disappeared during presentation of the window 400).

The alert notification window 400 shows notifications that are specific to a particular user contact (e.g., and also of a specific type, such as alert-type notifications rather than reminder-type notifications), with the window including a name 412 of the particular user contact and a selectable link 414 to cause the computing device to navigate to a presentation of a contact record for the particular contact (e.g., a listing that includes additional contact information, such as physical address, email address, phone number, birthday).

Figure 5:
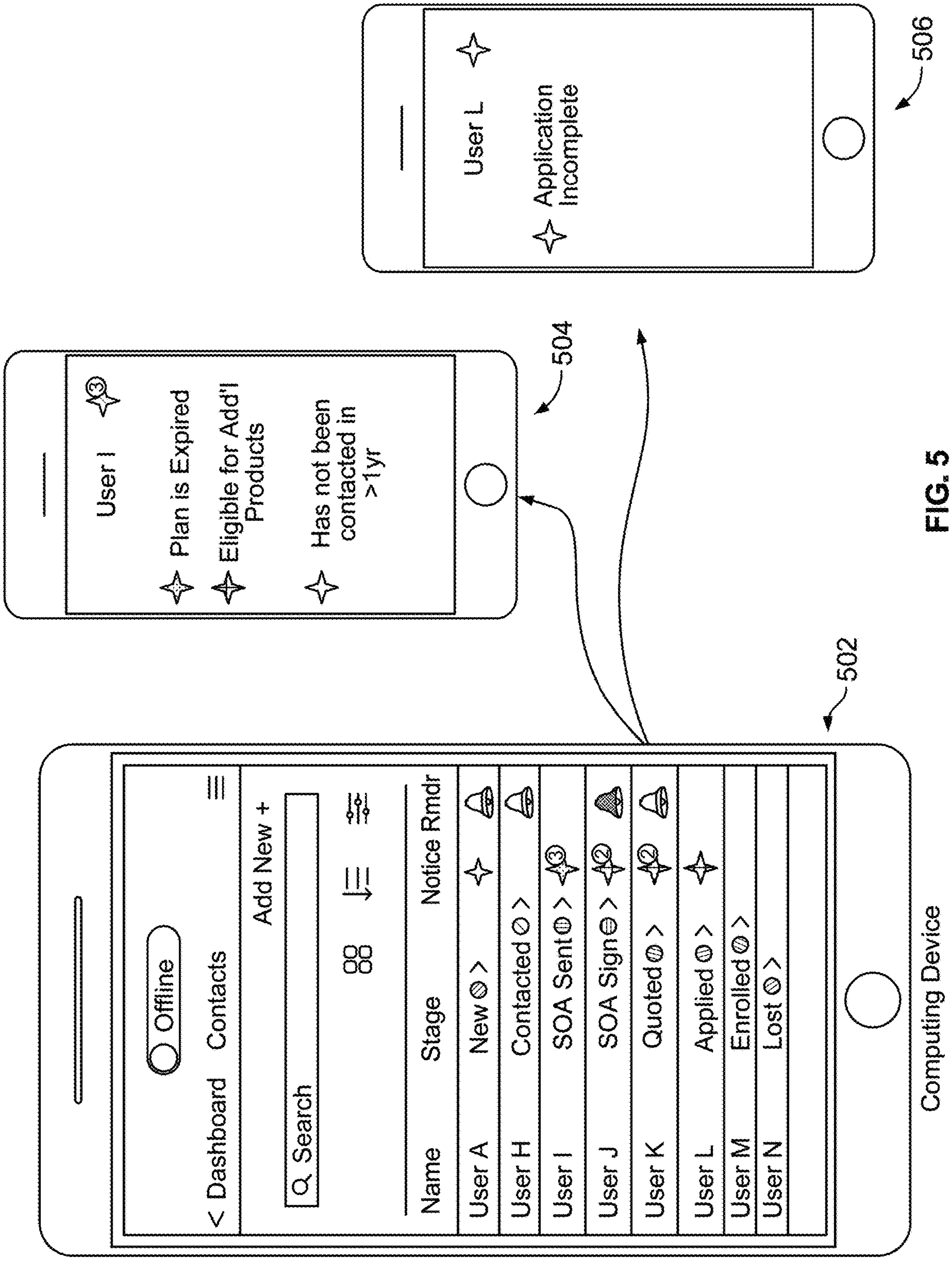
FIG. 5 illustrates an example GUI for a mobile device.

FIG. 5 illustrates an example GUI for a mobile device. GUI 502 can be similar to GUI 200 of FIG. 2, which shows a table of users with various information in adjacent columns. GUI 502 includes a column for names, a stage column (e.g., which can be similar to column 204 of FIG. 2), a notice column (e.g., which is similar to the alert column 210 of FIG. 2), and a reminder column (e.g., which is similar to the reminder column 206 from FIG. 2).

When an operator selects a notice-type notification-identification element that is presented next to, for example the name User I, the computing device can transition from displaying the screen of GUI 502 to displaying the screen of GUI 504. The GUI 504 screen lists the notice-type notifications associated with the corresponding user contact. Each listed notification can include a color-coded icon indicating a priority of that notification, such that the screen of GUI 504 presents multiple such elements for the multiple corresponding notifications, while the GUI 502 presents a single such element to represent all notice-type notifications for a particular user contact. User-selection of a notification-identification element for a different user contact, such as that associated with User L results in the computing device presenting a different notification list 506.

Figure 6:
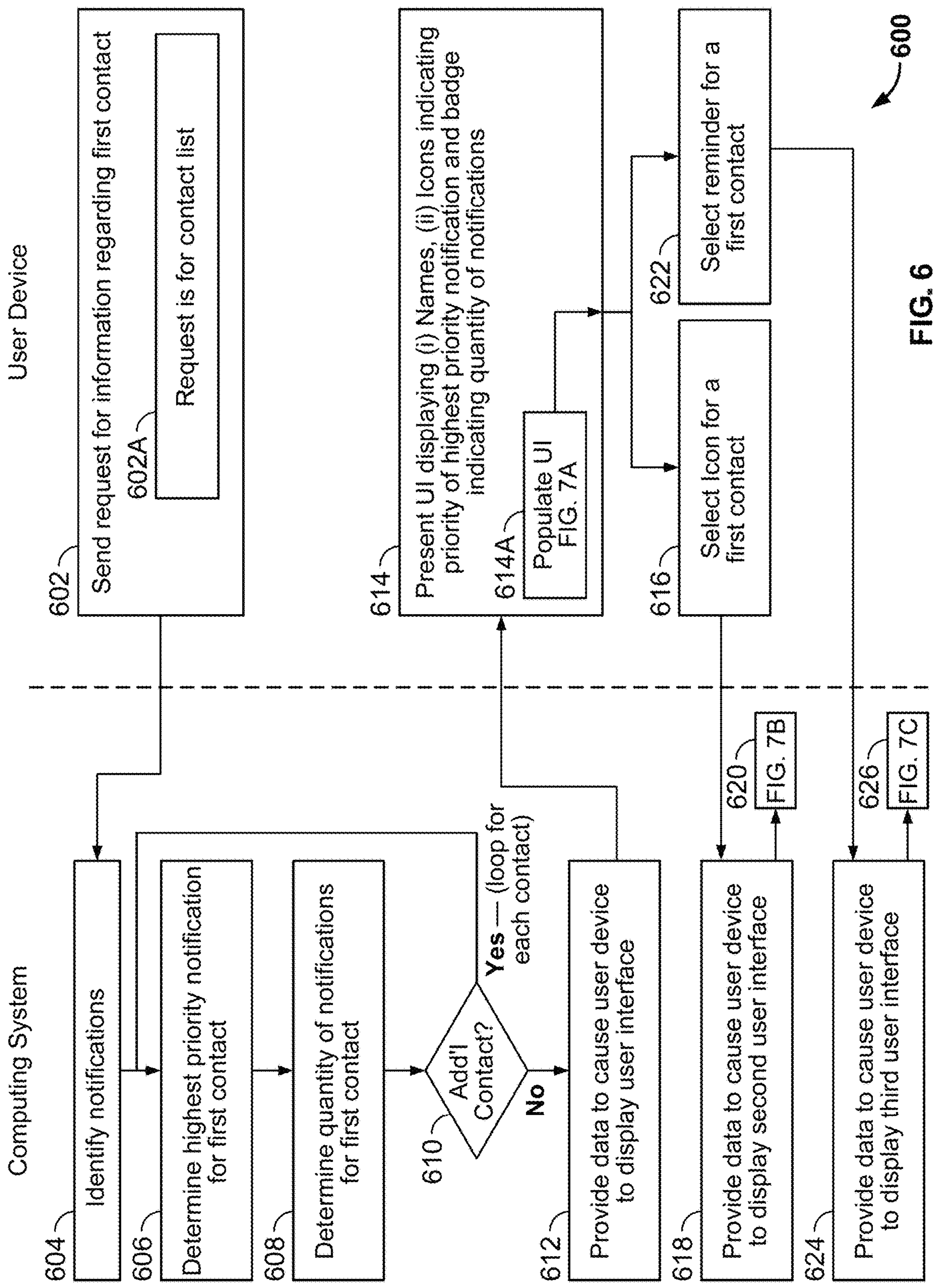
FIG. 6 shows a swim-lane flowchart of a process for generating and presenting interface elements that indicate multiple aspects of notifications.

FIG. 6 shows a swim-lane flowchart of a process for generating and presenting interface elements that indicate multiple aspects of notifications, with a left lane indicating processes performed by a computing system (e.g., a server or a collection of servers executing in a cloud computing environment), and a right lane indicating processes performed by a computing device (e.g., a user laptop or mobile device). The computing system and user device can represent the provider system 805 and agent computing device 804 discussed below with reference to FIGS. 8A-C.

At box 602, the user device sends a request to the computing system for information regarding a contact. For example, a computing device user that is interacting with the user device may select a link that is adapted to cause navigation to a screen that presents a contact list. As such, the request may be a request for a contact list (box 602A). As illustrated in FIG. 2 (and discussed in additional detail below), the contact list may include several contacts, including the first contact and can include additional information related to each contact.

At box 604, the computing system identifies notifications. The notifications may be assigned to user contacts in a contact list, with each user contact potentially being assigned multiple types of notifications and each notification being associated with a priority level.

At boxes 606 and 608, the computing system analyzes the identified notifications to determine, for each user contact in the contact list, a highest-priority notification assigned to the user contact (box 606) and a quantity of notifications assigned to the user contact (box 608), at least for a specific type of notification. In some implementations, multiple notifications have the same highest priority level. Regarding determining a quantity of notification, if a user contact has triggered four distinct events, four such notifications can be identified.

The operations of boxes 606 and 608 iterate for each user contact in a contact list (e.g., and possibly for each notification type), such that at box 610, the computing system determines whether there are additional contacts that need to be analyzed. If so, process 600 loops back to re-perform the operations of boxes 606 and 608 for each of the remaining user contacts. If the notifications assigned to each user contact have been analyzed, process 600 can proceed to box 612.

At box 612, the computing system provides data to the user device to cause the user device to display a user interface. The resulting user interface can include a contact list, as illustrated in FIG. 2 and described below in more detail. The data provided to the user device can include HTML and other website code, or other instructions that specify content to be presented in a user interface at the user device.

At box 614, the user device displays the user interface based on having received the data provided by the computing system. As illustrated in FIG. 2, the displayed user interface can include, for each user contact in a contact list: (i) a name of the user contact, and (ii) an icon indicating a priority of the highest priority notification stored for the user contact accompanied by an indication of the quantity of notifications for each contact. Additional details regarding how the user interface is populated with contact list information is described below with respect to FIG. 7A (box 614A).

Figure 7A:
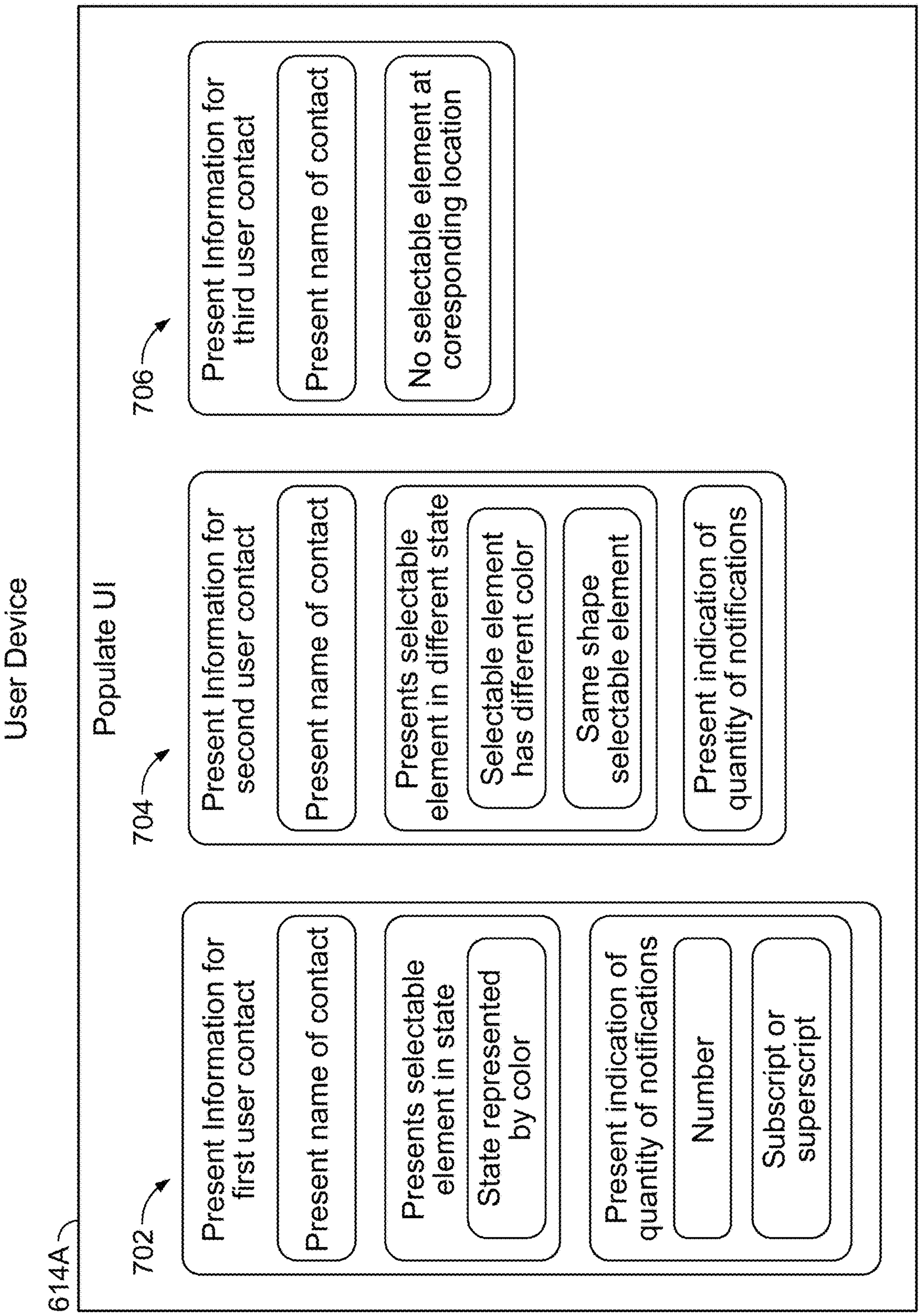
FIGS. 7A-7C show flowcharts that illustrate example GUI functionality on a user device.

FIG. 7A shows a flowchart diagram that illustrates various operations involved with presenting the user interface. As illustrated by FIG. 2, the contact list can include information for multiple user contacts, with FIG. 7A showing example operations involved with presenting information for three such contacts and how the presentations can differ, including presenting information for a first user contact (box 702), a second user contact (box 704) and a third user contact (box 706).

Boxes 702, 704, and 706 each include a box indicating that the user interface presents the name of each respective contact. These names may be text, and may be the actual name of the individuals represented by the user contacts in the contact list (e.g., the user names listed in FIG. 2). Boxes 702 and 704 indicate that the corresponding user contact entry in the contact list presents a selectable element. The selectable element may be a notification-identifying element of a particular type (e.g., selectable elements in columns 206 and 210 of FIG. 10), with Box 706 indicating the lack of a selectable element at a corresponding location for the third user contact, as a result of the computing system determining that the third user contact does not have queued for presentation a notification of the associated type.

Box 704 further indicates how the selectable element may be represented in a different state, to indicate a different priority level of a highest-ranking notification for the second user than for the first user. The state may be represented by color, with the selectable element being a different color for the second user than for the first user. Despite the different color, the shape of the selectable elements may be the same, as the selectable elements may represent different states of a common notification-identifying icon element.

As illustrated by boxes 702 and 704, each selectable element may be accompanied by a presented indication of a quantity of notifications available for display to a corresponding user contact. The indication of the quantity of notification may be a number, and may be a superscript number (as shown in FIG. 2) or a subscript number.

In some implementations, the information for the user contacts are displayed in a table format, with each contact being associated with space aligned in a row among multiple columns for presentation of information specific to the column, similar to GUI 200 of FIG. 2. In some implementations, information specific to each contact can be presented in a contact card, with the UI being populated as a tiled interface. Other suitable configurations of the UI are considered within the scope of this disclosure.

Returning to FIG. 6, at Box 616 the user device receives an indication of user selection of an icon for a particular user contact. For example, a computing device user that is viewing the contact list shown in FIG. 2 may use a mouse to click on (or tap with their finger on) a presentation of an alert-type notification-identifying element, such as element 220 in FIG. 2. The selected notification-identifying element may be an only notification-identifying element for the particular type of notification presented in association with a user contact in the contact list, despite multiple notifications of the type being active, available, or otherwise stored for the user.

At box 618, upon receipt of the request, the computing system provides data to cause the user device to display a second user interface. The second user interface provide additional detail regarding the notifications for the first contact, such as listing each of the notifications of the relevant notification type. The data provided by the computing system to the user device can cause the user device to populate the second UI as described below with respect to FIG. 7B (620).

Figure 7B:
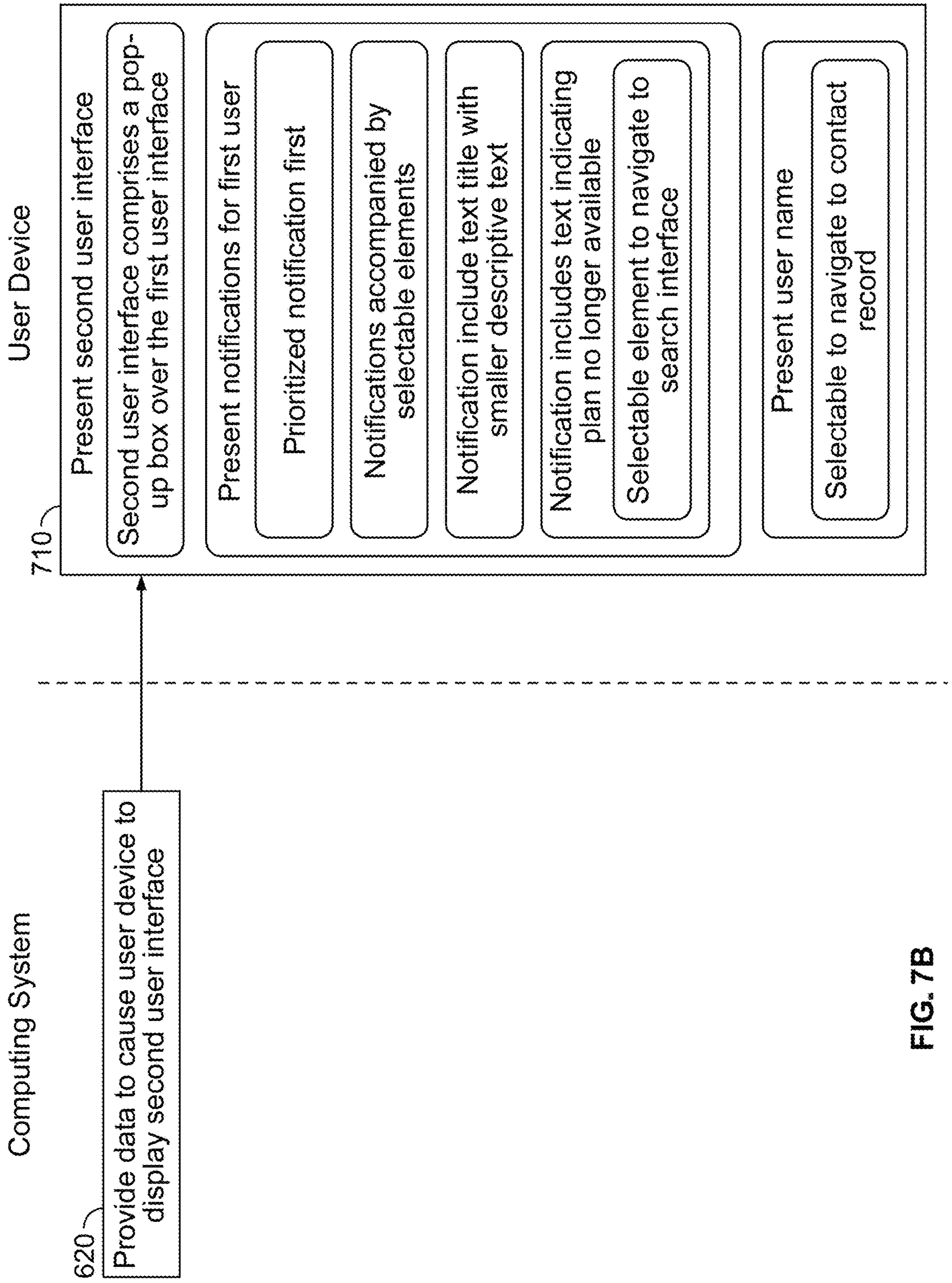

FIG. 7B shows an example swim-lane flowchart diagram of operations involved with presenting a second UI that includes a pop-up box (e.g., of user-specific notifications) presented over the first (e.g., contact list) user interface. FIG. 4 shows an example such interface of user-specific notifications that are of an "alert" type. The data provided by the computing system to the user device can cause the user device to present the interface with highest priority notifications listed first (e.g., at a top of the screen). Each notification can be accompanied by one or more interactive elements that can redirect a computing device user or otherwise connect a notification to other relevant UI's and systems. The notifications can each include a text title with smaller, descriptive text indicating the purpose for the notification. In some implementations, where a notification was generated by the computing system due to the computing system determining that a product to which the corresponding user account is enrolled has expired or is about to expire, the notification can include text indicating the product is no longer available, and include a selectable UI element that navigates to a search interface that enables the computing device user to search for alternative products in which the user contact may be interested.

At box 622, the user device receives an indication of user selection of an icon for a different type of notification for a particular contact (e.g., a reminder-type notification). For example, the computing device may return to returning to the contact list UI illustrated in FIG. 2 upon user input closing the alert-type notification window shown in FIG. 4. In some examples, user input selects a reminder-type notification identification element without having previously selected an alert-type notification identification element.

At box 624, upon receipt of the request, the computing system provides data to cause the user device to display a third user interface. The third user interface provides additional detail regarding the reminders for the first contact, such as listing each reminder-type notification. The data provided can cause the user device to populate the third UI as described below with respect to FIG. 7C (624).

Figure 7C:
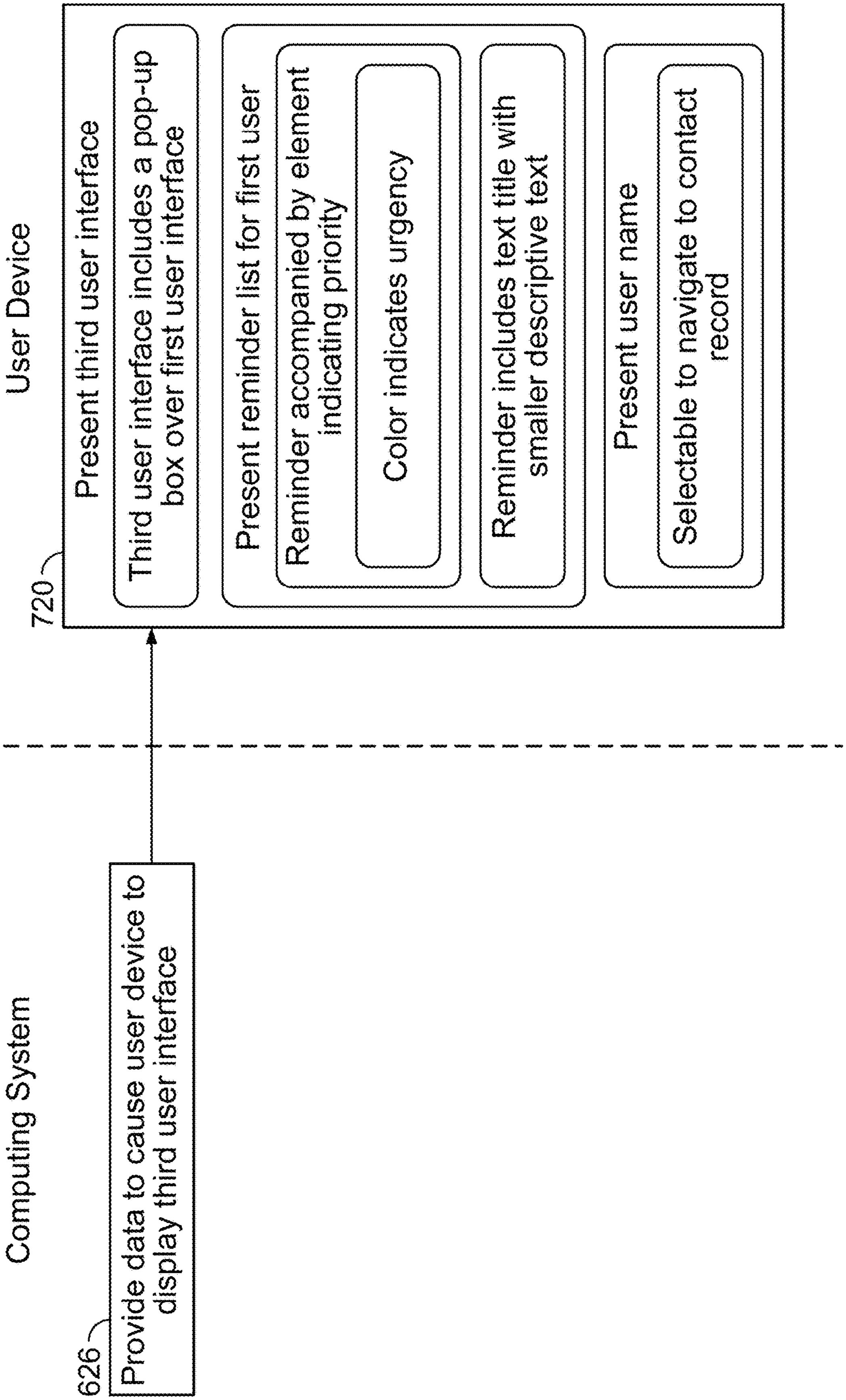

FIG. 7C shows an example swim-lane flowchart diagram of operations involved with presenting a third user interface that includes a pop-up box (e.g., of reminder-specific notifications) presented over the first (e.g., contact list) user interface. FIG. 3 shows an example such interface of user-specific notifications that are of a "reminder" type. The data provided by the computing system to the user device can cause the user device to present the reminder-type notifications in order of priority, even if the reminders were generated in a different order. Each reminder can include an element indicating a system-determined priority of the reminder. For example, each reminder can include a "bell" icon, where red shading indicates an urgent priority, and black shading indicating non-urgent priority. Each reminder can include a text title and smaller descriptive text. Each reminder can include information indicating a date and time at which the reminder is set and can include elements enabling user input to edit the reminder, as well as an element that is user selectable to remove the corresponding notification from the list of notifications and add a task indicated by the reminder to a completed list of tasks.

Figure 8A:
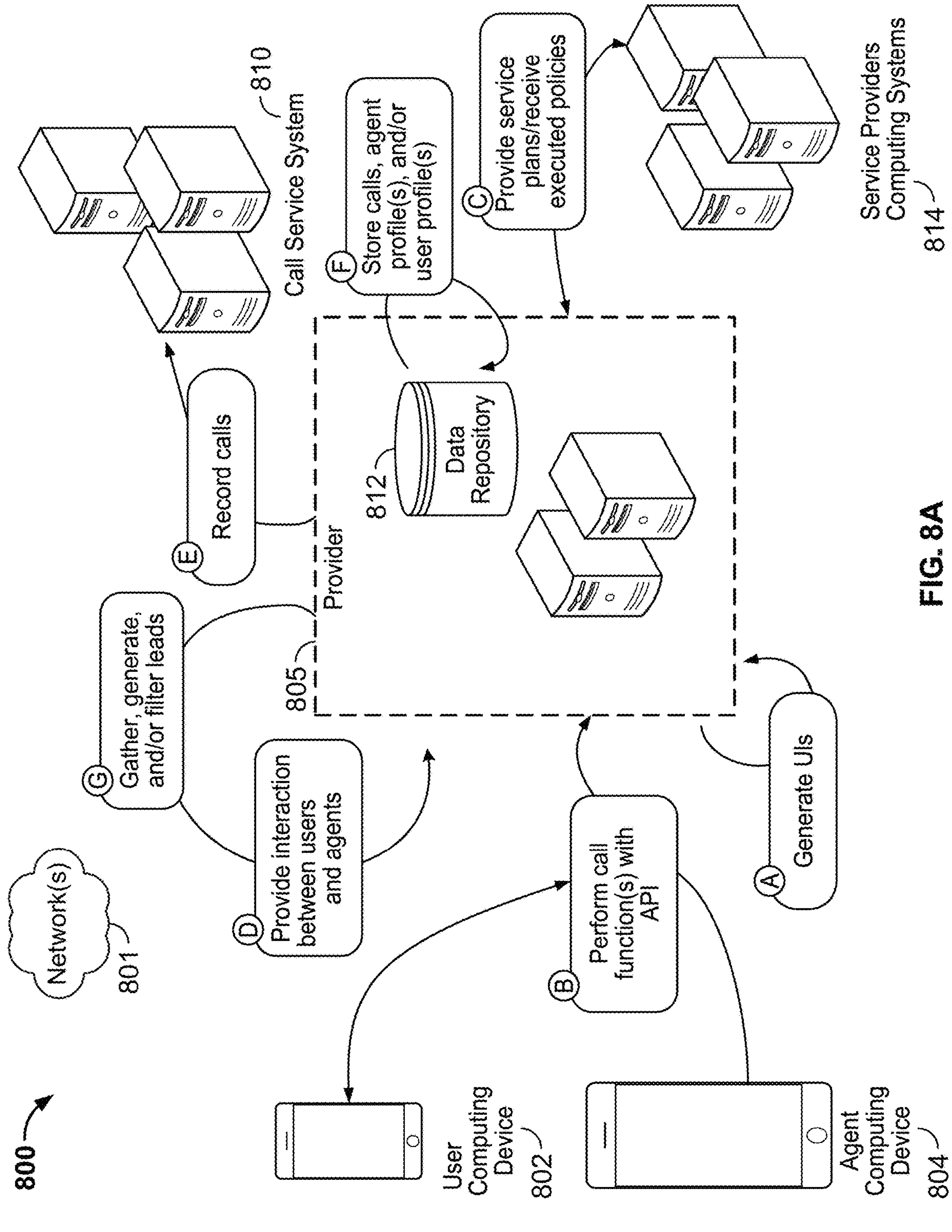
FIGS. 8A-C are conceptual diagrams that show interactions between components of an example computing environment that generates notifications and presents information regarding such notifications.
Figure 8B:
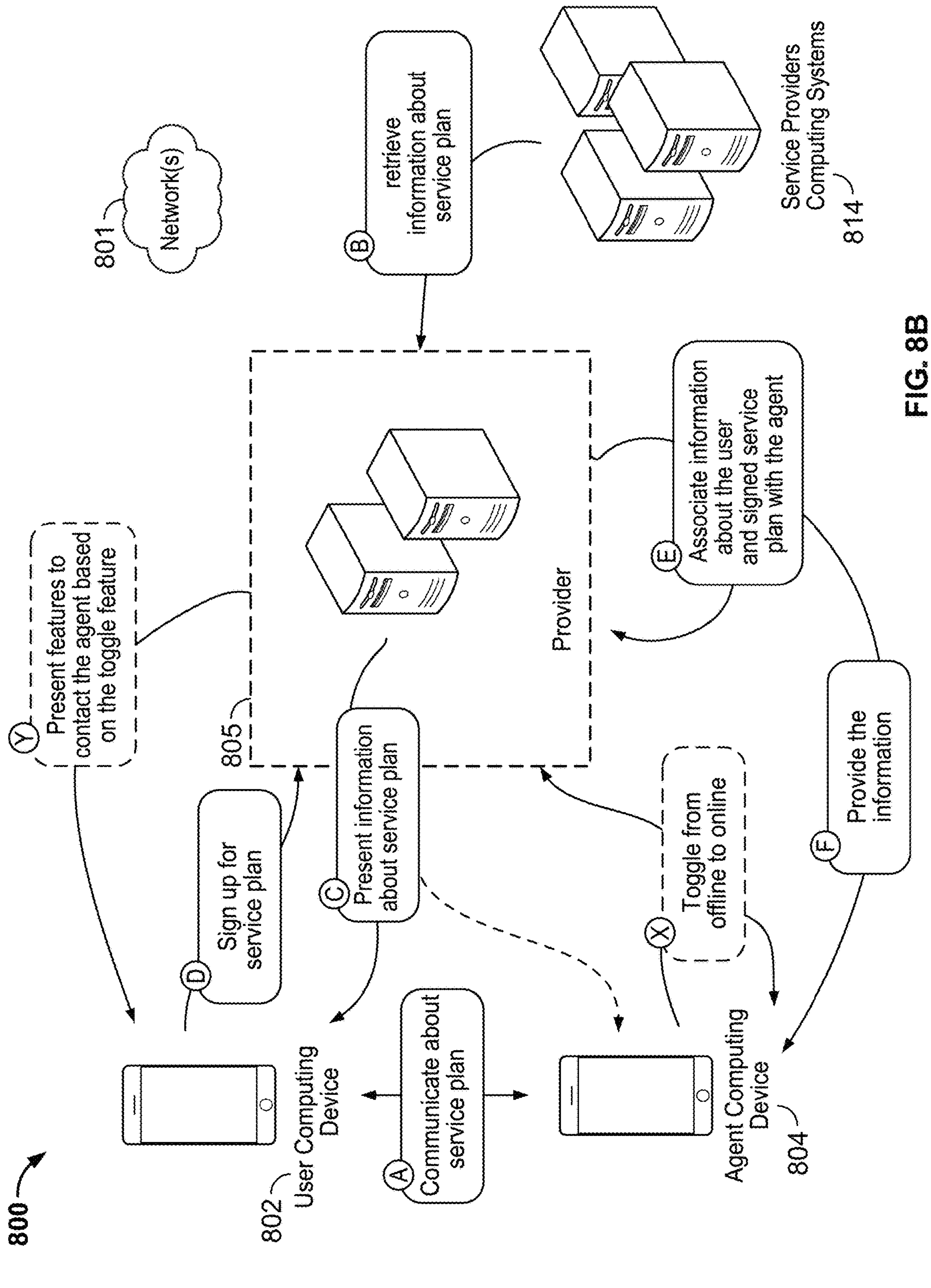
Figure 8C:
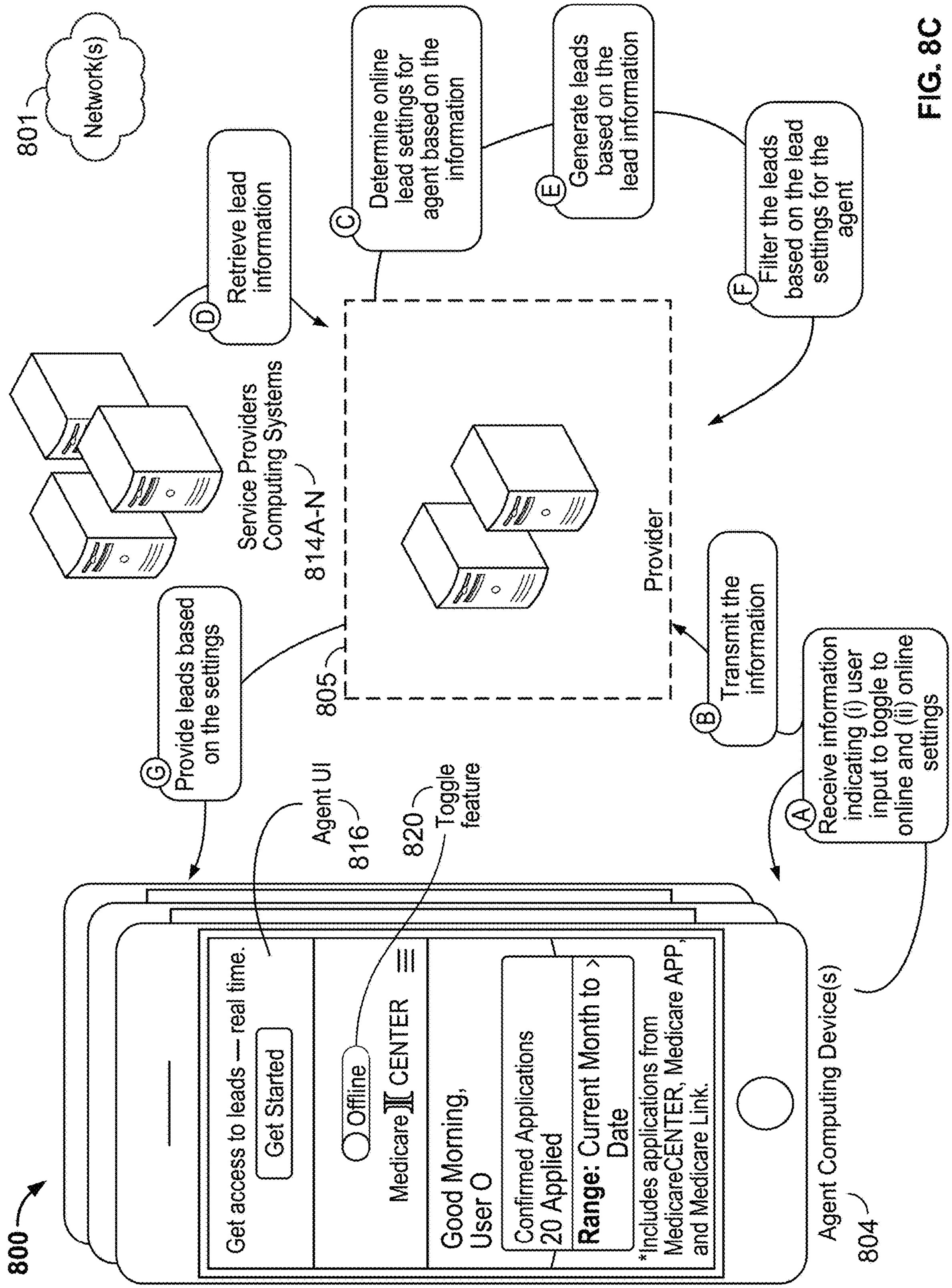

Referring to FIGS. 8A-C, an example computing environment 800 can facilitate interactions with a provider platform, in accordance with some embodiments. FIG. 8A is a conceptual diagram of the example computing environment 800 for facilitating improved agent communications, for example, in a process that achieves service enrollment. The computing environment 800 can be used to provide mobile and web-based applications and interfaces to computing devices of service agents and service users (e.g., potential and existing users) to provide communication between agents and users for service enrollment, preferably in a manner that provides an increased likelihood of compliance with relevant regulatory requirements.

A provider system 805, user computing device(s) 802, agent computing device(s) 804, call service system 810, and service providers computing systems 814 can communicate (e.g., wired, wireless) via network(s) 801 in the computing environment 800. The provider system 805 can be implemented as a cloud-based computing system, a server system, a network of computing systems/devices, or a combination thereof. The provider system 805 can be configured to interact with a mobile application to be used by service agents and users. The mobile application can be deployed in online application stores so that service agents and users can download the mobile application at their respective computing devices 804 and 802. Once the mobile application is downloaded at the computing devices 804 and 802, the computing devices can perform call functions with one or more APIs to interact with features of the mobile application. As described in more detail below (FIG. 8C), multiple agent computing devices 804 can interact with the platform of the provider system 805 so that each agent computer device 804 can identify and sort contacts in an improved manner based upon a predictive model that increases the likelihood of impactful engagements with at least a subset of those contacts. For example, some or all of the agent computing devices 804 (including the agent computing device 804 depicted in FIG. 8A and FIG. 8C) can be a smart phone device having a small screen form factor with an improved mobile interface that rapidly predicts and sorts an agent's contacts for presentation in a manner that can reduce the complexity and number of screens to be accessed.

Although this disclosure is described in reference to a mobile application that is executed at the computing devices 804 and 802 (depicted as portable smartphone devices in this example in FIG. 8A), the technology described herein can also be deployed in other applications and/or interfaces, such as a web-based interface, application, or software that can be deployed at laptops, tablets, and/or other computer systems. The provider system 805 can also be configured to provide communication between the service agents, users, and other computing systems to facilitate compliant service enrollment. For example, the provider system 805 can act as a gateway of communication between the computing devices 802 and 804 and the call service system 810, the service providers computing systems 814, and the data repository 812.

The provider system 805 can include one or more computing systems, servers, and/or storage systems. As an illustrative example, the provider system 805 can include one or more servers and a data repository 812. In some embodiments, one or more of the components mentioned above can be separate from the provider system 805 and in communication (via the network(s) 801) with the provider system 805. The provider system 805 may also include additional or fewer components, systems, etc. For example, the provider system 805 can include an API server, which can provide for communication of information between the provider system 805 and the agent computing devices 804 (e.g., presentation of and interaction with the mobile application described herein).

The provider system 805 can also be configured with a mobile application developer engine, module, software, cloud-based system, environment, and/or computing system. The provider system 805 can also be configured with a web server for development of a web application of the disclosed techniques and/or an application server for development of the mobile application of the disclosed techniques. The provider system 805 can generate graphical user interface (GUI) displays for the mobile application. The provider system 805 can release the mobile application to the online application stores to then be downloaded by the computing devices 802 and 804. Once downloaded and installed, for example, the computing devices 802 and 804 can make call functions with an API via the mobile application to provide the respective users with GUI displays for viewing information about service products (currently enrolled plans, available plans, etc.), communicating with service agents or other users, and maintaining user service profiles.

The data repository 812 can be a memory storage system/device, including but not limited to a data store, database, and/or cloud-based storage, or any combination thereof. The data repository 812 can be configured to store information about service agents and service users. For example, the data repository 812 can be configured to store enrollment information for each service user, lead settings for each service agent, and/or recorded inbound and outbound service calls.

The user computing device(s) 802 can be mobile phones, smartphones, laptops, tablets, wearable devices, or a combination thereof. The user computing device 802 can be used by a service user, such as an existing user and/or a potential user.

Similarly, the agent computing device(s) 804 can be mobile phones, smartphones, laptops, tablets, wearable devices, or a combination thereof.

The call service system 810 can be implemented as a cloud-based computing system, a server system, a network of computing systems/devices, or a combination thereof configured to record and store inbound and outbound service calls to increase likelihood of improving compliance with relevant regulatory requirements. The call service system 810 can also be configured to assign a call routing number to each service agent's phone number(s). As a result, whenever the agent places a call with their phone number or they receive a call to their phone number, the call can be (i) automatically routed, via the call routing number, to a phone number of the agent, which the agent can pick up at their computing device 804, and (ii) automatically recorded. Although the call service system 810 is shown as a separate component from the provider system 805, in some embodiments, the call service system 810 can be part of the provider system 805.

The service providers computing systems 814 can be implemented as a cloud-based computing system, a server system, a network of computing systems/devices, or a combination thereof and configured to generate and provide information about service products, such as service plans. Each of the service provider computing systems 814 can be operated by a different service provider, in some embodiments. The service provider computing systems 814 may generate service plans, store the service plans in one or more data repositories, and make the service plans available for retrieval and display at the computing devices 802 and 804. In some embodiments, one or more of the service providers computing systems 814 may be part of the provider system 805.

Still referring to FIG. 8A, the provider system 805 can generate UIs for the mobile application in block A. The provider system 805 can generate any of the UIs described herein, such as the examples described below in connection with FIGS. 8C, 9, 10A, and 10B. As part of generating the UIs, the provider system 805 can also develop the mobile application (or web-based interface/application) described herein and deploy the mobile application in online application stores. As detailed below, the generated UIs can be specifically optimized for a smart phone device having a small screen form factor and can rapidly predict and sort an agent's contacts for presentation in a manner that can reduce the complexity and number of screens to be accessed.

Once the mobile application is downloaded at the agent computing device(s) 804, users at the computing devices 804 can access the mobile application to manage service enrollment tasks/activities. The computing devices 804 can perform call functions with an API, via the mobile application, in order to display and interact with the GUIs of the mobile application (block B).

The service providers computing systems 814 can provide service products, such as plans, via the provider system 805, to the computing devices 802 and/or 804 for display in the mobile application (block C). As an illustrative example, the agent at the computing device 804 can select an option in the GUI displayed at their device to view available service plans for a particular user. Selecting the option can cause the computing device 804 to make a call function to retrieve service plans for the particular user. Those service plans can be provided by the service providers computing systems 814, via the provider system 805, and to the agent computing device 804 for display in the GUI.

The service providers computing systems 814 can also receive executed service policies, via the provider system 805, from the computing devices 802 and/or 804 (block C). As an illustrative example, the user at the computing device 802 can decide that they want to enroll in a service plan presented in a GUI at their device (e.g., accessible via the web). The user can sign, pay, and execute a policy for the service plan at the computing device 802. Once these actions are performed, information can be transmitted, from the user computing device 802, via an API call and the provider system 805 to the service providers computing systems 814. The service providers computing systems 814 can maintain information about the enrolled user and their service policy and provide any of that information to the provider system 805 to then be outputted/displayed at the computing devices 802 and/or 804 at one or more other times.

The provider system 805 can also perform one or more functions. For example, the provider system 805 can provide interaction between the users and agents via the mobile application at the respective computing devices 802 and 804 (block D). For example, the provider system 805 can open up a communication pathway between the agent at the computing device 804 and users (potential and/or existing) at their computing devices 802. For example, selectable options to contact the agent can be presented in the mobile application at the computing devices 802. The user can select the option to contact (e.g., call, email, message) the agent. The provider system 805 can facilitate this communication.

The provider system 805 can also interact with the call service system 810 to record calls between the user computing device 802 and the agent computing device 804 (block E).

The provider system 805 can also store calls, agent profiles, and/or user profiles information in the data repository 812 (block F). Information inputted in the mobile application by the user and/or agent at their respective computing devices 802 and 804 can be transmitted to the provider system 805 for storage. Calls recorded by the call service system 810 can also be transmitted to the provider system 805 for long-term storage. As an illustrative example, during the call between the computing devices 802 and 804, the call service system 810 can temporarily store the call in local storage. Once the call ends, the provider system 805 can retrieve the recorded call from local storage of the call service system 810 and store the recorded call in the data repository 812 for long-term storage. A length of the long-term storage can vary depending on the relevant regulatory requirements. For example, some regulations may require the call to be stored for 10 years. Once the 10 years end, the provider system 805 can remove the recorded call from the data repository 812.

The provider system 805 can also gather, generate, and/or filter leads for the service agent at the agent computing device 804 (block G). In some implementations, the service agent can provide information in the mobile application at the agent computing device 804 indicating leads. The service agent can provide information to establish data leads and/or real-time call leads. Based on the information provided by the service agent, the provider system 805 can identify what leads to send to the agent at their computing device 804 when the agent has an activity status of "online."

As an illustrative example, when the agent is online and accepting data leads, the provider 805 can make a contact for a user associated with a data lead, store the user contact in the data repository 812, and transmit a push notification (or other alert, message, etc.) to the agent computing device 804 with lead information. The agent can then choose to accept the data lead in the mobile application at their computing device 804 and perform actions in response to the data lead (e.g., calling the user associated with the lead, contacting the user via email, text, and/or message).

As another illustrative example, when the agent is online and accepting call leads, a call lead can first be transmitted, from the user computing device 802, to an inbound call center service, then routed to the provider system 805. The provider system 805 can review the inbound call and determine whether it satisfies the information provided by the agent seeking to receive call leads. If the inbound call satisfies the agent-provided information (e.g., the call originates within a state where the agent is licensed), then the provider system 805 can generate a contact for the user associated with the call lead, store the user contact in the data repository 812, route the call to a phone number of the agent, which the agent can receive at their computing device 804 via the agent's designated phone number, and transmit a push notification (or other alert, message, etc.) to the agent computing device 804 with lead information. The agent can then choose to accept the call lead in the mobile application at their computing device 804 and perform actions in response to the call lead (e.g., picking up the call).

The blocks A-G can be performed in any order. In some embodiments, block A can be performed at a first time and blocks B-G can be performed at one or more other times that are later than the first time. Moreover, the computing devices 802 and 804 can perform call functions with the API (block B) at one or more various times in order to communicate with any of the components described herein, transmit information between the components, and/or receive information from the components. As another example, the provider system 805 may only perform block G (gathering, generating, and/or filtering leads) whenever the agent at the computing device 804 requests leads (e.g., the agent changes their activity status from "offline" to "online"). Calls may also be recorded (block E) whenever the user at the computing device 802 and/or the agent at the computing device 804 initiates a call with the other party, regardless of whether service plans have been provided/displayed at the devices 802 and/or 804 (block C) and/or whether leads have been provided to the agent computing device 804 (block G). The blocks A-G can be performed in one or more other orders.

Referring now to FIG. 8B, the computing environment 800 can be configured to provide service enrollment information at the computing device 802 of the service user. The service enrollment information can be provided to the computing device 802 using a personalized URL ("pURL"). The pURL can be a unique web address created for a specific target of a campaign (e.g., a marketing campaign). Each agent can have their own pURL, which they can share with their users. The pURL can render a unique landing page or microsite for the specific target (e.g., a user that has previously interacted with the particular agent) when the pURL is selected by the specific target at their respective computing device. For example, the agent can provide their pURL to a potential service user (e.g., via a communication from the agent computing device 804 during or after a call with a particular user). When the service user selects the pURL, their computing device 802 can present a uniquely customized service quoting/enrollment website in a web browser at the computing device 802, including for example, the website being personalized with the particular agent's information and personalized enrollment options for that user based upon the information gathered in the previous communications between that particular agent and the user.

Accordingly, in some embodiments, a pURL allows the user to view service policies and take actions based on the policies from their computing device 802 with or without the agent being online. For example, the user and the agent can simultaneously view the same service policy information at their respective computing devices 802 and 804. The user and agent can also communicate about that service policy while the agent is online. If the agent is offline, the user can continue to view the service policy information at their computing device 802 and take actions, such as executing the service policy, renewing their service policy, paying for their service policy, etc. Any actions taken by the user at their computing device 802 (e.g., via the pURL website displayed at the browser of the user device 802) with respect to the service policy can be transmitted to the provider system 805 and linked to/associated with the agent who acted upon the lead for this user and handled an earlier consultation. In such circumstances, an agent who invested time in communicating with a particular user about various service options can further provide the option for that particular user to consider such options (e.g., via the pURL displayed at the computing device 802) even after the call between the agent and the particular user is terminated, and when the particular user enrolls in one of the service options (e.g., presented at the customized landing page of the pURL for that user), the system can readily recognize and credit that agent's role in the new enrollment of that user (e.g., even if the agent is offline or otherwise not actively working with the particular user at that time).

As an illustrative example, if the user signs and pays for the service policy at their computing device 802, the executed policy can be transmitted from the computing device 802 to the provider system 805. The provider system 805 can then transmit the executed policy to a service provider computing system that provides the service plan under the executed policy. The computing device 802 can also transmit notification of the executed/paid for policy to the provider system 805 so that the provider system 805 can provide commission information and updated user/client information to the agent at the agent computing device 804.

Using such pURL embodiments, the disclosed technology provides user-friendly interfaces and techniques for the user to more readily and efficiently make decisions at their computing device 802 about enrolling in service plans or other service products with or without real-time communication with the agent. Moreover, if the agent is offline, once the agent toggles their activity status to being "online," the provider system 805 can cause a GUI (e.g., accessible via the web or Internet) presented at the computing device 802 of the user to be dynamically updated in real-time with a selectable option to contact the agent. Therefore, the user can have real-time communication with the agent about the service plan they are viewing at the user computing device 802. In fact, the user and the agent can view the same information about the service plan in real-time at their respective computing devices 802 and 804. The user can also continue to maintain autonomy and perform actions in response to the service plan (e.g., execute a service policy) at the user computing device 802 even while the agent is online, the agent is viewing the same service plan at their computing device 804, and/or the user is communicating with the agent (e.g., talking on the phone).

Still referring to FIG. 8B, the agent computing device 804 and the user computing device 802 can communicate about a service plan or other service product (block A). For example, a data and/or call lead can be established between the agent and the user. The user can indicate that they would like to review/view/sign a service policy. The agent computing device 804 can transmit a notification (e.g., text message, email, or other type of notification) to the user computing device 802 with the agent's pURL information. The notification can include a selectable link, such as a URL. The user can select the link at their computing device 802, which triggers display of information about the service plan at the user computing device 802. The information, which can include service plan quotes and/or plan quote comparisons, can be presented and accessible via the Internet or web at the computing device 802.

More particularly, the provider system 805 can retrieve the information about the service plan from the service providers computing systems 814 (block B).

The provider system 805 can then provide the retrieved information to be presented at the user computing device 802 (block C). Optionally, the provider system 805 can also provide the retrieved information to be presented at the agent computing device 804 in block C. As a result, the information about the service plan can be concurrently presented and viewed at both the user computing device 802 and the agent computing device 804.

Once the information about the service plan is presented/outputted at the user computing device 802, the user computing device 802 can receive various user inputs from the user. An example user input can include selection of an option to sign up for the service plan (e.g., enroll in the service plan). This user input can be transmitted from the user computing device 802 to the provider system 805 (block D). One or more other user inputs may also be received at the user computing device 802, such as providing signatures of the user, providing payment information for enrolling in the service plan, and/or providing any other information needed to enroll in the service plan. Advantageously, the pURL allows for the user to have autonomy in what service plan they enroll in and what information they provide for enrollment. Therefore, the user may not be required to go through the agent at the agent computing device 804 to enroll in a service plan of the user's choosing. The user can enroll in the service plan even when the agent's activity status is offline or the agent is otherwise unavailable to communicate with the user.

Once the provider system 805 receives the user input indicating that the user has signed up for the service plan, the provider system 805 can associate information about the user and the signed service plan with the agent of the agent computing device 804 (block E). For example, the provider system 805 can generate a user contact profile for the user and assign the user to the agent as the agent's user. The provider system 805 can make this association, regardless of whether the agent was online when the user signed up for the service plan and/or whether the agent assisted the user in reviewing the information about the service plan and making the decision to enroll. The agent can be assigned the user for one or many associations, which can include the fact that the agent accepted the lead for this user, the agent provided this user with the pURL, and/or the user initiated communication with the agent.

The provider system 805 can also provide the association information to the agent computing device 804 (block F). For example, the agent computing device 804 can output the user contact profile for review by the agent. Additionally or alternatively, the agent computing device 804 can output information about the signed service plan. The agent computing device 804 can output any other information described in the below GUIs for the particular user who enrolled in the service plan (e.g., reminders, activity, recorded calls).

When the agent changes their activity status, the provider system 805 can provide information to the user computing device 802 that causes the user computing device 802 to present one or more features (or change presentation of those features) to contact the agent (block Y). For example, if the agent changes from offline to online status, the information provided to the user computing device 802 can cause the user computing device 802 to dynamically update a GUI currently outputted at the user computing device 802 to include a selectable option, such as a button, to contact the agent. The user can then provide user input to select the option, thereby causing a communication (e.g., phone call, text message, email) to be established between the user and the agent so that the parties can discuss the service plan.

As another example, if the agent changes their status from online to offline, the provider system 805 can provide information to the user computing device 802 that causes the contact option to indicate that the user is offline or otherwise unavailable. In some implementations, the contact option can be updated to be non-selectable for as long as the agent is offline. Sometimes, the information can cause the user computing device 802 to dynamically update the current GUI by removing the contact option from the GUI. Sometimes, the information can cause the user computing device 802 to dynamically update the current GUI by greying out the contact option and therefore making the contact option non-selectable. Regardless of the current activity status of the agent, the information about the service plan can continue to be presented/outputted at the user computing device 802. The user can also continue to maintain autonomy and provide one or more user inputs to interact with the information presented about the service plan (e.g., sign up for the service plan, provide payment information for the service plan).

Referring to FIG. 8C, the computing environment 800 can be configured to provide for the service agent to toggle between being offline and online. As described herein, the agent can change their activity status from being offline to being online and vice versa. The agent can toggle between offline and online activity status using graphical elements presented in a GUI 816 at the agent computing device 804. For example, the GUI 816 can include a toggle feature 820, such as a button or slider. The agent can select/click on the toggle feature in the GUI 816 at the computing device 804 to change their activity status.

As shown in FIG. 8C, the agent computing device 804 can receive information indicating (i) user input to toggle to the online activity status and (ii) online settings (block A). The user input can be selecting or clicking on the toggle feature 820 presented in the GUI 816 at the computing device 804. The online settings can include information provided by the agent about what leads the agent would like to receive. For example, the agent can indicate what kind of leads they currently want to toggle on (e.g., text and email and/or phone leads). The agent can also indicate whether they would like to toggle on different types of leads and/or pURL communications. In some implementations, the agent can indicate additional information, such as how many leads and an area or zip code where the agent wants the leads from when they set up a leads campaign through another service, such as a call center. The information received in block A can be transmitted to the provider system 805 in block B.

Also illustrated in FIG. 8C, multiple agent computing devices 804 can communicate with provider system 805. Each agent computing device 804 can have unique parameters such as a geographic region, a particular user base, age, preferred user contact method, etc. The provider, when determining lead settings and generating leads (blocks C and E as described below) as well as filtering the leads can consider the settings associated with each particular agent computing device 804, as well as all of the agent computing devices 804 in aggregate.

Using the information, the provider system 805 can determine online lead settings for the agent (block C). The provider system 805 can, for example, determine, based on the information, a lead provider from which to generate/filter leads for the agent. As another example, the provider system 805 can determine, based on the information, how many leads to send to the agent and/or what type of leads to send to the agent (e.g., call leads, data leads such as emails, forms, and text messages).

Based on the lead settings, the provider can retrieve lead information in block D. The lead information can include contact information for users having questions about service coverage/plans and/or seeking service coverage. The lead information can also include phone calls.

The provider system 805 can generate one or more leads based on the lead information in block E. The provider system 805 can continuously generate leads and/or generate leads at predetermined time periods (e.g., once every 24 hours, once every 32 hours, once every 48 hours, whenever new lead information becomes available). The provider system 805 can generate the leads regardless of whether the agent toggled their activity status to online or other agents toggled their respective activity status to online. A lead can be generated once a user called or filled out a form on a website to indicate that they want to talk to an agent based on landing on the website. A lead can also be generated if the user interacted with a third party vendor and indicated that they desire to purchase service, then the vendor sold that lead to the provider system 805.

The provider system 805 can filter the generated leads based on the lead settings for the agent of the computing device 804 (block F). The provider system 805 can identify a set of leads that match filtering criteria for the particular agent. The filtering criteria can be based on the lead settings for the agent. As an illustrative example, the agent can indicate what criteria must be met for the agent to receive a lead. If the criteria is met (e.g., data leads in a particular zip code indicated by the agent), then the lead can be delivered to the computing device 804 of that agent. Moreover, as described herein, when a lead comes in, the provider system 805 can determine whether any agent has a campaign set up that matches information about the lead (e.g., the zip code), whether that agent has met their maximum number of lead requirements yet, and/or whether that agent has toggled to an online activity status. This information can be used to determine which agent to route the lead to.

As mentioned above, the lead that matches the filtering criteria (e.g., the campaign) for the particular agent can be provided to the agent computing device 804 based on the lead settings of the agent (block G). The leads can be provided to the agent computing device 804 at different times. For example, the agent computing device 804 can receive one lead at a time, with a threshold amount of time passing between each lead. As another example, the agent computing device 804 can receive multiple leads at a time, with a threshold amount of time passing between each multiple leads. As another example, the agent computing device 804 can receive all the filtered leads, then the agent computing device 804 can present one or more leads at a time or at other predetermined periods of time in the GUI 816.

When the agent clicks on the toggle feature 820 to toggle from the online activity status to the offline activity status, a notification indicating such change can be transmitted to the provider system 805. The provider system 805 can then stop generating, filtering, and/or providing leads to the agent computing device 804. The provider system 805 can resume any one or more of generating, filtering, and/or providing the leads to the agent computing device 804 once the agent clicks on the toggle feature 820 to change their activity status to being online.

Figure 9:
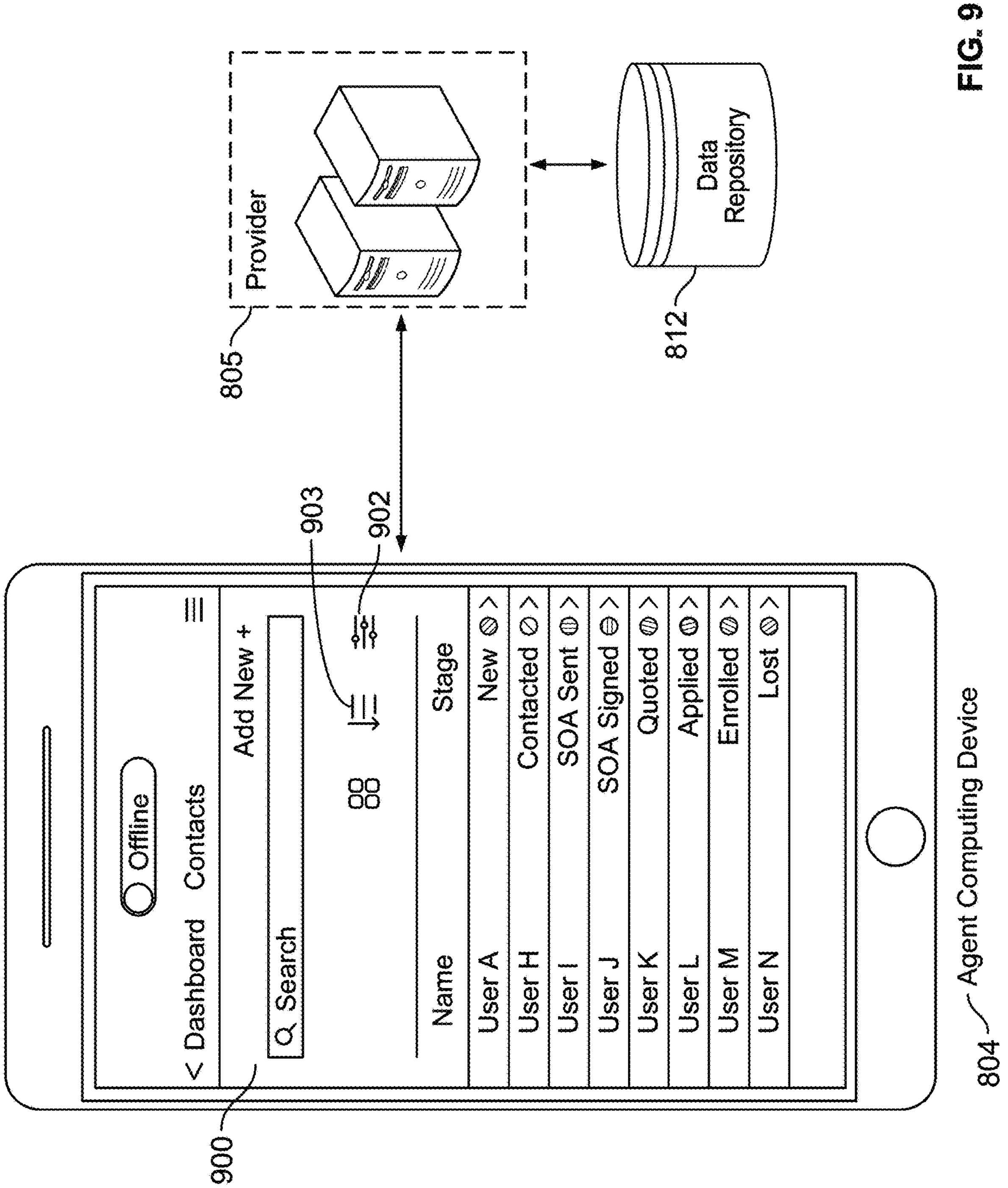
FIG. 9 is an example GUI displaying user contacts in a list view at a computing device within the system of FIGS. 8A-C.

FIG. 9 is an example GUI 900 displaying user contacts in a list view at a computing device within the system of FIGS. 8A-C. The GUI 900 can be displayed in response to the agent selecting a menu option to view their contacts. The GUI 900 can also be displayed in response to the user selecting one or more other options presented in one or more other GUIs to view the agent's user contacts.

The GUI 900 can be presented in a mobile application, web interface, or other application at the agent computing device 804 described herein. The GUI 900 can also be presented in a web interface of another type of computing device, such as a laptop, tablet, and/or computer.

Moreover, FIG. 9 shows the agent computing device 804 communicating with at least the provider system 805 (refer to FIG. 8A). The provider system 805 can provide the GUIs described throughout this disclosure to the computing device 804 for providing beneficial information to the agent, eliciting input from the agent, facilitating communications between the agent's computing device 804 and one or more devices of users, and automatically identifying relevant service policy products (e.g., insurance plan products) based on information associated with a specific user. The provider system 805 can have access to one or more data repositories 812 of information. The provider system 805 can, for example, store user information in the data repository 812 and then retrieve the user information based on requests received from the computing device 804. For example, the provider system 805 can retrieve the user contacts from the data repository 812 and present the user contacts in the GUI 900 at the computing device 804. The provider system 805 can also automatically update information in the data repository 812 based on detected interactions of the agent and/or the user with their respective computing devices and based on communications between the computing device 804 of the agent and computing devices of users. Although communication between the computing device 804 and the provider system 805 is described in reference to presenting the GUI 900, the same or similar communication can also be established to present any of the other GUIs described herein.

In some embodiments, the GUI 900 can present additional or different information for each of the user listings. For example, each user listing can include a next reminder data, a preferred primary contact method, and/or one or more selectable controls/options to view, modify, and/or change information about the particular user. The GUI 900 can also include a control 903 to sort the user listings presented therein. Selecting the sort control 903 can, for example, cause a dropdown menu to be displayed that allows the agent to sort or filter the user listings according to various selection criteria. This can include sorting or filtering by name, geography, product types of interest, status, follow-up date (e.g., listing users in order of the next follow up reminder set for that user), date the contact was added to the system, or any of the other fields for information for the user or other criteria established by the agent or by the system. For example, the agent can sort the user listings based on tags that have been assigned to the contacts (e.g., by the agent and/or automatically by the system).

Filter control 902 can be selected to open a pop-out window in order to enable the user of the agent computing device 804 to select which users or subset of users is displayed in GUI 900. The pop-out window presented when filter control 902 is selected is described and shown in more detail below with respect to FIG. 10A.

Figure 10A:
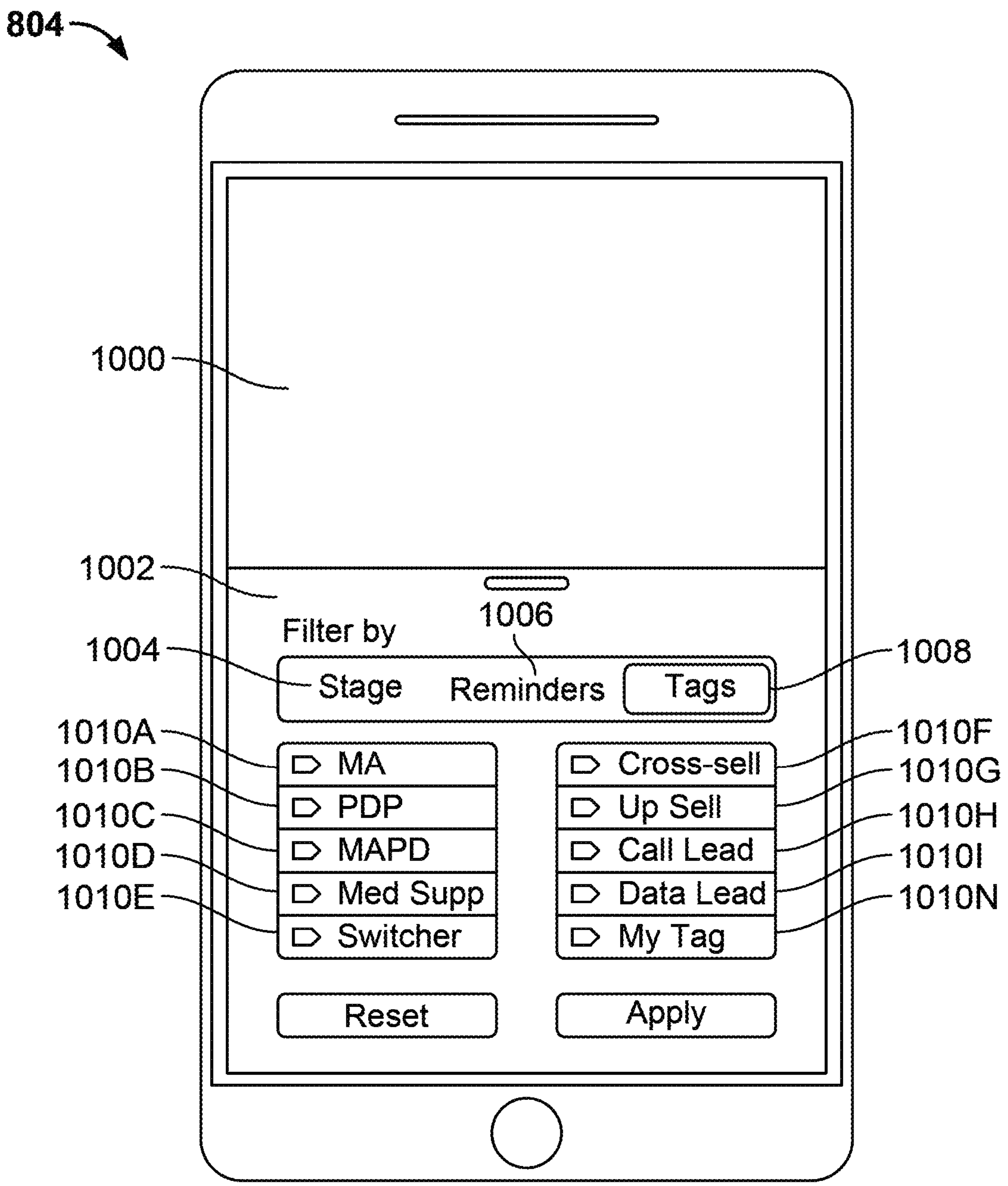
FIG. 10A is an example pop-out window for filtering user contact information according to tags while using a computing device within the system of FIGS. 8A-C.

FIG. 10A illustrates an example pop-out window 1002 for filtering user information according to tags while using computing device within the system of FIGS. 8A-C. The pop-out window 1002 can be presented in a mobile application, web interface, or other application at the agent computing device 804 described herein. The pop-out window 1002 can also be presented in a web interface of another type of computing device, such as a laptop, tablet, and/or computer.

The pop-out window 1002 can be presented, by the system, to visually overlay a GUI 1000, where the GUI 1000 can represent any one or more of the GUIs described throughout this disclosure. For example, the GUI 1000 can be the GUI 900 described in FIG. 9, and the pop-out window 1002 can be presented at the computing device 804 in response to the agent selecting a filtering option (e.g., control, button) presented in the GUI 900. As another example, the GUI 1000 can be the GUI 816 described in FIGS. 8A-C, and the pop-out window 1002 can be presented at the computing device 804 in response to the agent selecting the interacting with the agent device 804 to view and/or add tags to the user contact.

The pop-out window 1002 provides the agent with various selectable options to filter and/or sort how information is presented in the GUI 1000. The pop-out window 1002 includes selectable tabs 1004, 1006, and 1008. The tab 1004 can be selected by the agent to filter information presented in the GUI 1000 according to stage of activity/communication between the agent and a user or multiple users. Upon selecting the tab 1004, the system can display different stages that the agent can select to filter the information presented in the GUI 1000. The tab 1006 can be selected by the agent to filter information presented in the GUI 1000 according to reminders (e.g., types of reminders, dates/times associated with the reminders). Upon selecting the tab 1006, the system can display different information about reminders that the agent can select in order to filter and/or sort the information presented in the GUI 1000. The reminders can include reminder-type notifications discussed with reference to at least FIGS. 1-7C.

The tab 1008 can be selected by the agent to filter and/or sort information presented in the GUI 1000 according to one or more tags, the tags having been determined/generated manually by the agent and/or automatically by the system (e.g., the provider system 805). In the example of FIG. 10A, the tags tab 1008 has been selected by the agent. The pop-out window 1002 therefore displays tags 1010A-N that have been generated either manually or automatically. The agent can select one or more of the tags 1010A-N in order to view information in the GUI 1000 that have been assigned the selected tag(s) 1010A-N. The information assigned to the tags can include alert-type notifications discussed with reference to at least FIGS. 1-7C, with the tags representing different types of alert-type notifications.

As described herein, the tags 1010A-N can be assigned (as metadata set to a user contact) to users manually by the agent and/or automatically by the system using AI or other rulesets/algorithms. Some of the tags 1010A-N can be preset values, as defined by the system. The agent can also create additional tags that can then be applied/assigned to user contacts.

The agent can manually assign one or more of the tags 1010A-E and/or 1010F-N to user contacts. Each of the tags 1010A-E can, for example, represent service plans or other products. For example, tag 1010A represents "Medicare Advantage product," tag 1010B represents "Prescription Drug Plan," tag 1010C represents "Medicare Advantage with Prescription Drug Plan," tag 1010D represents "Medicare Supplement," and tag 1010E represents "Switcher." Each of the tags 1010F-N can, for example, represent attributes of a user that can be automatically determined by the system (and/or manually applied to the user by the agent). The tag 1010F can represent "Cross-sell," tag 1010G represents "Up sell," tag 1010H represents "Call Lead," tag 1010I represents "Data Lead," and tag 1010N represents "My Tag." The system can run analytics rulesets and/or algorithms, such as AI techniques, on the backend to information stored for each user contact in order to determine how to tag the user contact. The system can automatically tag a user contact with one or more of the tags 1010A-N, for example, by generating a corresponding alert-type notification with a type of the assigned tag. When the system tags the user contact, the system can also determine a confidence value or likelihood corresponding to an activity/other information associated with the tag.

Among the tags 1010A-N, the tag 1010F representing cross-sells and the tag 1010G representing up sell indicates likelihood that a particular user may switch to another service plan. As an illustrative example, a user can be enrolled in a plan that does not include dental benefits. The system can determine, with some level of confidence, that the user likely would want to switch to another plan that includes dental benefits, so the system can tag the user's profile with the cross-sell tag 1010F. When the agent sees that the user has been assigned this tag, the agent can better determine what information to present to the user to provide the user with alternative plans rather than (or in addition to) an option to renew their currently-enrolled plan. Among the tags 1010A-N, the tag 1010N "My Tag" can represent any tag that the agent generated as a custom tag.

Switcher tag 1010E can be automatically generated to indicate that a user is likely to switch plans either in the present or within a predetermined future time (e.g., 1 year, 5 years, etc.). By filtering users tagged with switcher tag 1010E, the agent can immediately identify users that will likely need or be interested in a different plan than what they already have.

The switcher tag 1010E can be assigned to each user by a backend system which performs an analysis on each user to identify a switching score. Users with a switching score greater than a predetermined threshold can be tagged with switcher tag 1010E (e.g., and also create a corresponding alert-type notification). In some implementations the switching score is a function of three separate analyses.

A first analysis can identify users who will need to switch, or "absolute switchers." These users must find a new coverage plan because their current plan no longer provides coverage. For example, a plan may no longer be available, the user's primary care provider may no longer be in network, the user may have relocated to a different region where the plan is not available, etc. If any of these "absolute" switching conditions are met, the user can be assigned a switching score high enough that they will be guaranteed to receive a switcher tag 1010E. In some implementations, these "absolute switchers" can get a unique tag, separate from other switchers discussed below.

A second analysis can identify users who are likely to switch based on their condition or behavior. The second analysis can consider user factors such as age, income, prescription utilization, residency, etc. Each parameter can be given a weight that is then summed with the remaining parameters to identify an overall score. For example, low-income users may be more likely to switch coverage plans than higher income users. Therefore, a user with a lower income may have a higher switching score if all other parameters are held constant.

A third analysis can be performed to identify users who are likely to switch based on a change in their coverage. For example, if the premium for a particular plan increases, or the max out of pocket for that plan increases, users with that plan are more likely to switch. An analysis of each user's current plan compared to what their plan will cover and cost in the upcoming year can identify whether a user is likely to want to switch based on changes to their plans.

Each of the above discussed parameters can be analyzed based on historical data, which can include data of users who previously switched, in order to assign weights to each parameter. These parameters can each be identified, for example, by using a statistical correlation matrix, than analyzed with a model to determine a plan score for each plan and each user. If, for a particular user, a plan score is greater than a predetermined threshold over their current plan's score (e.g., a plan has a 25% higher score than their current plan), then that user can be tagged as a "switcher."

In some implementations, one or more machine-learning algorithms are used to generate a scoring function to tag users. The machine-learning algorithms can include, but are not limited to, convergent neural networks, transformer networks, recursive neural networks, or other artificial intelligence systems. In some implementations, statistical modeling is performed on the historic data, and weights are assigned based on the statistical modeling.

In addition to developing a scoring function to identify users who are likely to switch coverage plans, the computing system can analyze current coverage plans to identify gaps in coverage or future gaps, and recommend supplementary products. For example, if a user is switching to a particular coverage plan, however they have prescription glasses and that plan doesn't cover eyecare, sub products (such as an eyecare coverage plan) can be recommended automatically, and the user can be given a cross sell tag 1010F and a corresponding alert-type notification generated for the user.

Figure 10B:
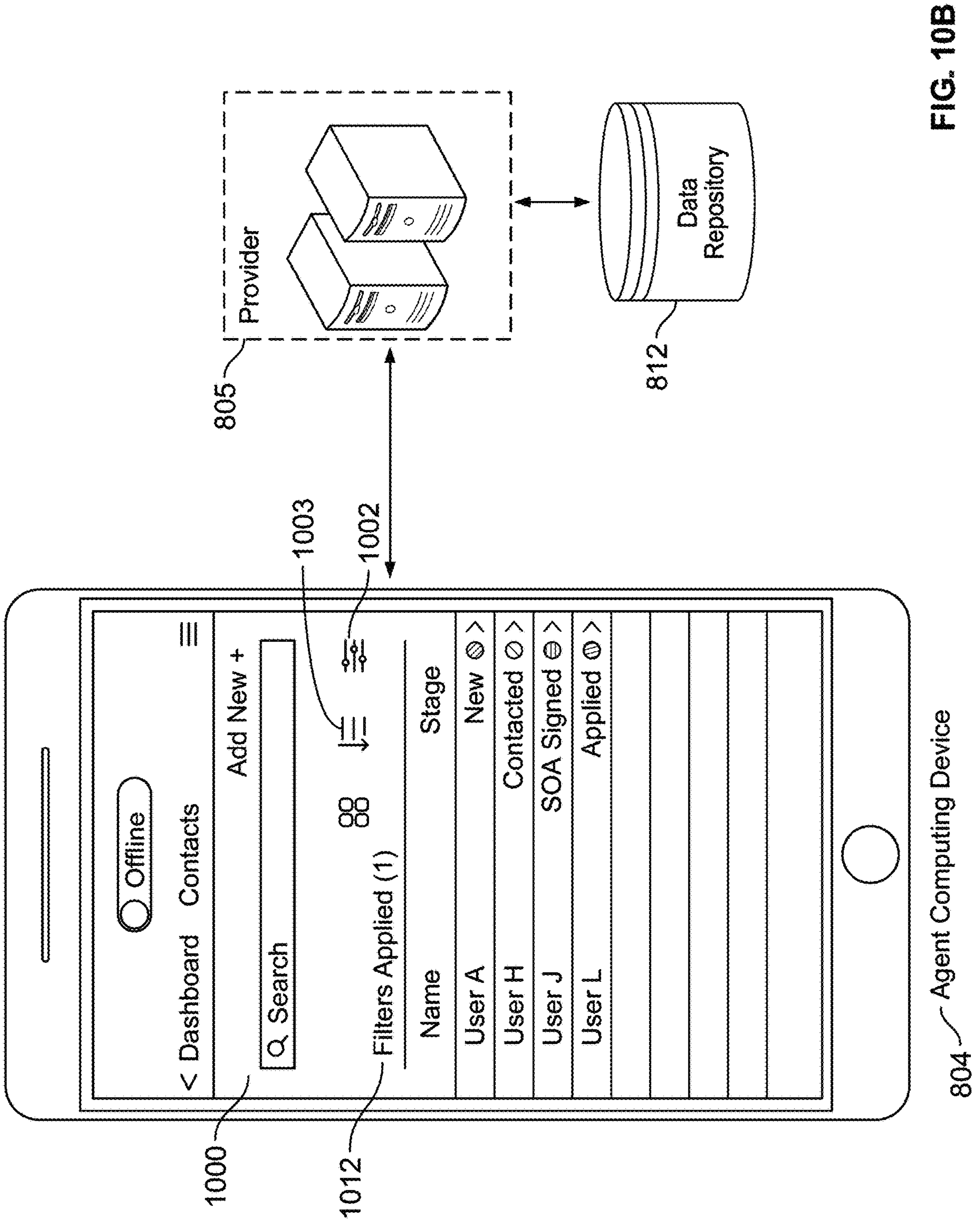
FIG. 10B is an example GUI displaying user contacts in a list view at a computing device that has been filtered according to the tags of FIG. 10A.

FIG. 10B illustrates an example GUI displaying user contacts in a list view at a computing device that has been filtered according to the tags of FIG. 10A. The GUI 900 of FIG. 10B is what might be presented as a modification to the GUI 900 of FIG. 7 when the user selects the switcher tag 1010E in FIG. 8 In FIG. 10B, the presented contacts list has been filtered and is presenting only the contacts that have been tagged as a "switcher." The pop-out window 1002 has receded and a filtered list is shown.

A filtering indicator 1012 can be presented to show that the current contact list is not a complete list, but has been filtered. Further filtering indicator 1012 shows how many filters have been applied (one in the illustrated example). In some implementations the filtering indicator 1012 can show additional information, such as what parameters are being filtered by, how many items have been filter, or how many are being presented out of a total, unfiltered list.

Figure 11:
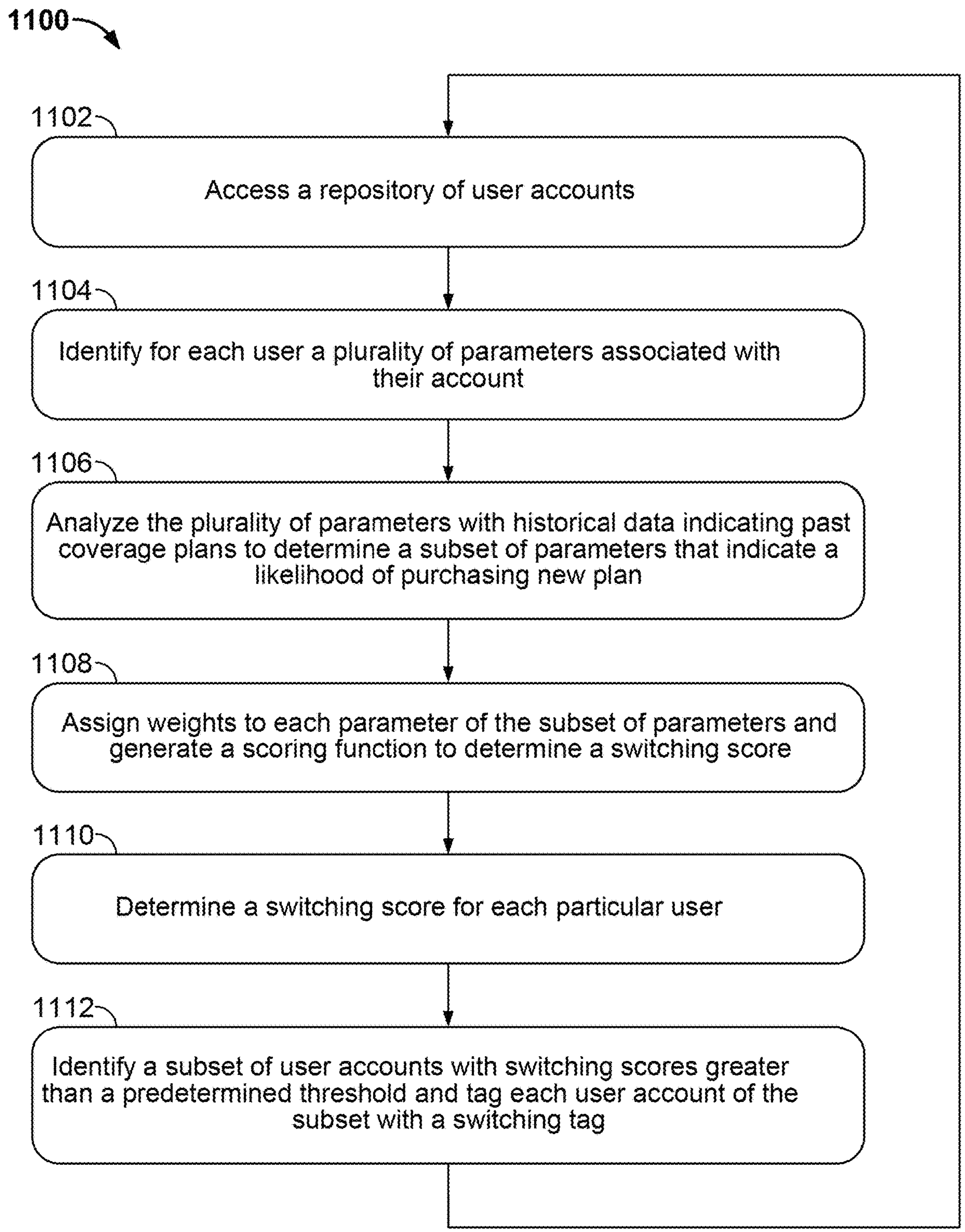
FIG. 11 is a flowchart of a process for identifying and tagging certain user contacts.

FIG. 11 is a flowchart of a process 1100 for analyzing and automatically tagging users with a switching tag, in accordance with some embodiments. The process 1100 can be performed by the call service system 810 described in at least FIGS. 8A-C. The process 1100 can also be performed by one or more components of the provider system 805 described herein. The process 1100 can also be performed by one or more other computing systems, devices, computers, networks, cloud-based systems, and/or cloud-based services. For illustrative purposes, the process 1100 is described from the perspective of a computer system.

At 1102, a repository of user accounts is accessed. The repository can be, for example, data repository 812 of FIG. 8A-C, or FIG. 2. In some implementations, the data repository is a cloud storage, or remote storage platform that stores account data for users in an anonymized way. That is, personally identifiable information such as actual name, address, telephone number, etc., can be encrypted or partially removed to provide data that can be analyzed without compromising any individual's security and privacy. In some implementations, multiple repositories from multiple entities can be crawled in order to extract data. For example, a third party plan tracking repository can be used in conjunction with agent sales data to identify a number of user accounts.

At 1104, a plurality of parameters are identified for each user account that are stored in the repository. In some implementations, there are hundreds of parameters for each user, including name, address, region, employment, current coverage, past coverage, premium information, health information, etc.

At 1106 each user account is analyzed with historical data that shows past coverage plans for that account. In this manner, accounts that have switched coverage plan can be identified, and parameters that those switching accounts share can be assessed as likely indicators of switching events. These can be determined as a subset of parameters that indicate a user's likelihood of switching. In some implementations, this subset of parameters includes, for example, plan availability, primary care provider network status, user zip code and recent changes in user zip code, user income, user age, plan age, user prescription utilization (e.g., users with more than seven distinct medications are more likely to switch plans), plan premium changes, plan out-of-pocket changes, plan deductible changes, and others.

At 1108, weights can be assigned based on the performance of a statistical analysis on the subset of parameters in order to generate a scoring function that can be applied to individual user accounts. The weights can be determined based on, for example, the commonality of a particular parameter amongst accounts that switched (e.g., how often a particular parameter indicates an account will switch), or other correlations. In another example, the subset of parameters can be analyzed with a k-means clustering algorithm and a weight can be assigned based on how strongly they cluster. In some implementations, the switching score is determined using one or more machine-learning models, which are trained to review parameters for thousands of users and for each user holistically identify a switching score.

At 1110, a score is assigned to each user indicating how likely they are to switch based on the scoring function and the parameters associated with their particular account. In some implementations, the score is a normalized number (e.g., between 0 and 1). In some implementations the score is a weighted sum of each parameter in the previously identified subset. If a user's score exceeds a predetermined threshold, at 1112, that user can be tagged with a switching tag (e.g., switcher tag 1010E in FIG. 10A above) which can then be used by agents when searching or filtering clients. As discussed above, the computing system can also generate a corresponding alert-type notification (e.g., with a title indicating that the client has been designated as a potential "Switcher").

Process 1100 can be an iterative process, which repeats periodically. For example, process 1100 can be performed on an annual basis, re-updating the scoring function weights, threshold, and user tags each year. In some implementations, process 1100 repeats and is triggered when new data is received, for example, access to an updated database, or every time a certain number of new plans or plan changes occur.

Figure 12:
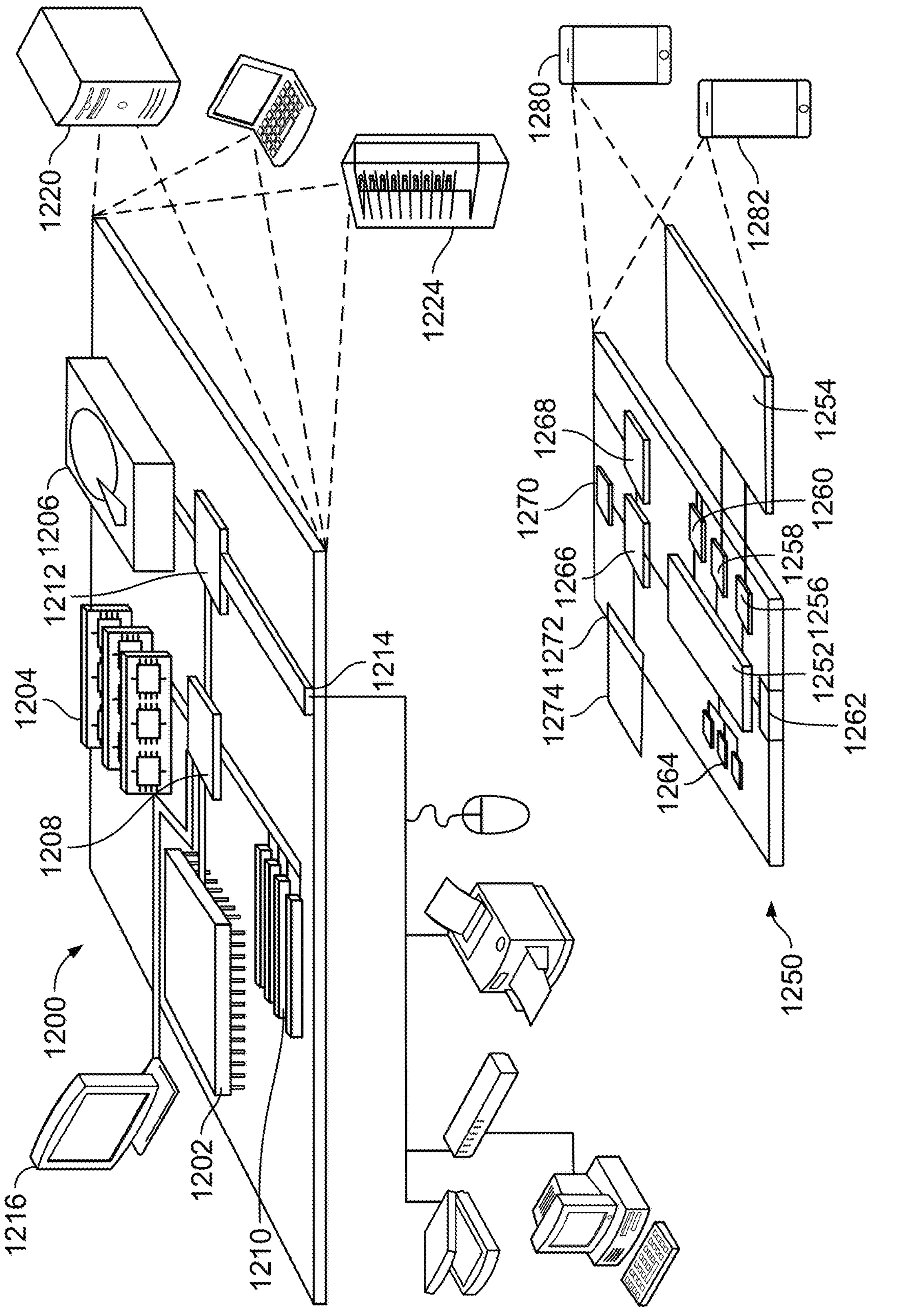
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit embodiments of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other embodiments, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some embodiments, the memory 1204 is a volatile memory unit or units. In some embodiments, the memory 1204 is a non-volatile memory unit or units. The memory 1204 can also be another form of computer-readable medium, such as a magnetic or optical disk.

The storage device 1206 is capable of providing mass storage for the computing device 1200. In some embodiments, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer-or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some embodiments, the high-speed interface 1208 is coupled to the memory 1204, the display 1216 (e.g., through a graphics processor or accelerator), and to the high-speed expansion ports 1210, which can accept various expansion cards (not shown). In the embodiment, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some embodiments, or for wireless communication in other embodiments, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250 or can also store applications or other information for the mobile computing device 1250. Specifically, the expansion memory 1274 can include instructions to carry out or supplement the processes described above and can include secure information also. Thus, for example, the expansion memory 1274 can be provide as a security module for the mobile computing device 1250 and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some embodiments, a computer program product is tangibly embodied in an information carrier. The computer program product contains instructions that, when executed, perform one or more methods, such as those described above. The computer program product can be a computer-or machine-readable medium, such as the memory 1264, the expansion memory 1274, or memory on the processor 1252. In some embodiments, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi, or other such transceiver (not shown). In addition, a GPS (Global Positioning System) receiver module 1270 can provide additional navigation-and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

This document generally relates to technology for improving interactions between service agents, service providers, and service users and, optionally, for achieving technological solutions that increase the likelihood such interactions comply with regulatory requirements. Some implementations of systems and methods described herein include providing improved GUIs at computing devices operated by a provider (e.g., such as a FMO in particular implementations) to facilitate seamless and intuitive experiences, communication, and improved compliance with the regulatory requirements between service agents and service users. For example, the disclosed technology can automatically identify and tag certain users who are likely to need or currently need assistance.

For example, the system can perform a predictive analysis on large groups (e.g., thousands, tens of thousands, or more) of service users and their associated plans, and identify parameters that are likely to indicate that a user needs to, or will need to switch plans. This analysis can consider coverage availability, primary care provider network status, user location, user address, user income, user age, user prescription utilization, coverage plan premium amount, coverage plan out of pocket price, deductibles, and other parameters. This data can be provided to, for example, a computer-implemented predictive model (e.g., a proprietary machine-learning model, a neural network model, or statistical historical model) to identify weights and importance associated with each parameter in order to develop a function by which to score individual users. These scores can be used to generate tags, such as a "switcher" tag in some examples below, that indicate a particular user is likely to need to switch plans. Optionally, each agent computing device (described below) can receive contact information (including those bearing the generated tags) and can advantageously sort and organize the contact information via an improved user interface that presents a sorted subset of contacts on a small form factor interface.

In another example, the computer-implemented predictive model can be used to identify cross-sell situations where a particular user's current plan does not fully cover them. For example, if a user is prescribed medication from a particular specialty (e.g., a chemotherapy medicine), but their plan does not cover that specialist, the need for additional products or supplemental coverage can be identified using a cross-sell tag.

For those implementations in which the computer-implemented predictive model is a statistical model, such a model can rapidly (an, optionally, simultaneously) process a large set of contacts using a correlation test, regression model, variance analysis, covariance analysis, Chi-square analysis, or combination thereof. Further analysis can be performed by other models, such as clustering algorithms such as k-means clustering, hierarchical clustering, DBSCAN clustering, etc.

In some implementations, the computer-implemented predictive model is a machine-learning model trained on similar data in order to recognize indicators that identify users who are likely to switch. In some implementations, the machine-learning model can be a feedforward autoencoder neural network. For example, the machine-learning model can be a three-layer autoencoder neural network. In some implementations, the machine-learning model includes more layers (e.g., 5, 10, etc.). The machine-learning model may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, Stochastic Gradient Descent (SGD), or SGD with momentum. In some implementations, the neural network may apply a mathematical transformation, e.g., a convolutional transformation or factor analysis to input data prior to feeding the input data to the network.

In some implementations, the machine-learning model can be a supervised model. For example, for each input provided to the model during training, the machine-learning model can be instructed as to what the correct output should be. The machine-learning model can use batch training, e.g., training on a subset of examples before each adjustment, instead of the entire available set of examples. This may improve the efficiency of training the model and may improve the generalizability of the model. The machine-learning model may use folded cross-validation. For example, some fraction (the "fold") of the data available for training can be left out of training and used in a later testing phase to confirm how well the model generalizes. In some implementations, the machine-learning model may be an unsupervised model. For example, the model may adjust itself based on mathematical distances between examples rather than based on feedback on its performance.

A machine-learning model can be trained to recognize and identify parameters that are likely to indicate that a user needs to, or will be statistically more likely to switch plans. This analysis can consider coverage availability, primary care provider network status, user location, user address, user income, user age, user prescription utilization, coverage plan premium amount, coverage plan out of pocket price, deductibles, and other parameters.

Particular implementations include a method and systems for predictive contact sorting including presenting a first graphical user interface (GUI) at a mobile device, including a list of client contact with each client contact indicating a name and status and each client contact representing a client or prospective client of an agent operating the mobile device. A selection of a filter control element with in the GUI can be received, and in response a second GUI is presented displaying a plurality of tags by which to filter the contacts. A selection of a switcher tag in the second GUI can be received and the first GUI can be presented with a filtered list of client contacts that includes a subset of the list of client contacts, the client contacts of the subset each associated with the switcher tag.

Some implementations include associating each client contact of the subset of client contacts with the switcher tag by analyzing a plurality of parameters associated with a client account and historical data indicating past coverage plans over a predetermined period using a predictive model. The predictive model can determine a subset of the plurality of parameters that indicate a client is likely to purchase a new coverage plan and assign a weight for each parameter of the subset of the plurality of parameters. Using the assigned weights, a switching score for each particular client can be determined, the switching score indicating a likelihood that each particular client will change coverage. A subset of client accounts with switching scores greater than a predetermined threshold can be identified.

In some instances, the predictive model is a K-means clustering algorithm.

In some instances, the predictive model includes a neural network.

In some instances, the predictive model includes one or more machine learning algorithms.

Another implementation of the disclosed solution includes a server system and method that accesses a repository of client accounts, each client account identifying a particular client and a coverage plan the particular client is subscribed to. For each client, a plurality of parameters associated with the client account is identified. The plurality of parameters is analyzed using a predictive model and historical data indicating past coverage plans over a predetermined period. The predictive model can determine a subset of the plurality of parameters that indicate a client is likely to purchase a new coverage plan and assign a weight for each parameter of the plurality of parameters. Using the assigned weights, the system can determine a switching score for each particular client, the switching score indicating a likelihood that each particular client will change coverage. A subset of client account with switching scores greater than a predetermined threshold can be identified and tagged with a switching tag.

In some instances, the subset of the plurality of parameters includes coverage plan availability, primary care provider network status, client zip code, client income, client age, client prescription utilization, coverage plan premium amount, and coverage plan out of pocket price. In some instances, the coverage plan availability represents whether each particular plan will be available to the particular client during the following year.

In some instances, the historical data indicating past coverage plans includes three years of historical data.

In some instances, the predictive model is a K-means clustering algorithm.

In some instances, a list of clients is provided for display at a remote computing device, the list of clients being filtered based on the switching tag.

In some instances, the predictive model determines the subset of the plurality of parameters that indicate a client is likely to purchase a new coverage plan annually.

In some instances, the predictive model analyzes the plurality of accounts' coverage and identifying a subset of accounts with coverage gaps and tags the subset of accounts with coverage gaps with a cross-sell tag.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method, comprising:

receiving, by a computing system, a request from a user device to present information regarding a first user contact;

identifying, by the computing system, multiple notifications generated for the first user contact, each notification of the multiple notifications assigned a priority level for the respective notification from a collection of different priority levels for notifications;

determining, by the computing system, a prioritized notification from among the multiple notifications generated for the first user contact, based on the priority level assigned to the prioritized notification having a highest priority level from among the priority levels assigned to the multiple notifications;

identifying, by the computing system, a quantity of the multiple notifications that have been generated for the first user contact;

providing, by the computing system responsive to the computing system receiving the request from the user device to present information regarding the first user contact, data to cause the user device to display a user interface that presents:

(i) a name of the first user contact;

(ii) a selectable element presented in a first state that indicates the status level of the prioritized notification, that is accompanied by an indication of the quantity of the multiple notifications that have been generated for the first user contact, and that is presented in a different color responsive to the computing system determining that prioritized notification has a different priority level from among the priority levels assigned to the multiple notifications;

providing, by the computing system, data to cause the user device to present the multiple notifications generated for the first user contact in a second user interface, responsive to the user device receiving user input that selects the selectable element, the second user interface presenting a list the notifications that includes:

(i) the prioritized notification at a beginning of the list of notifications, as a result of the prioritized notification having been determined by the computing system to have the highest priority level from among the priority levels assigned to the multiple notifications, the prioritized notification presented with text that provides a title for the prioritized notification and text that provides a description for the prioritized notifications and that is smaller than the text that provides the title for the prioritized notification; and (ii) other notifications of the multiple notifications following the prioritized notification, wherein at least one other notification is presented with text that provides a title for the at least one other notification and text that provides a description for the at least one other notification and that is smaller than the text that provides the title for the at least one other notification.

2. The computer-implemented method of claim 1, wherein:

the presentation of the selectable element in the first state comprises presenting the selectable element with a first color; and the computing system is configured to provide data to cause the user device to present the selectable element with a second color instead of the first color, responsive to the computing system determining that prioritized notification has a different priority level from among the priority levels assigned to the multiple notifications.

3. The computer-implemented method of claim 1, wherein:

the presentation of the indication of the quantity of the multiple notifications comprises presenting a number that is smaller than the selectable element next to the selectable element, the number corresponding to the quantity of the multiple notifications.

4. The computer-implemented method of claim 1, the presentation of the indication of the quantity of the multiple notifications comprises presenting a subscript or superscript number that corresponds to the quantity of the multiple notifications.

5. The computer-implemented method of claim 1, wherein:

the request from the user device comprises a request for a contact list;

the first user interface comprises the contact list, with the contact list concurrently presenting:

(a) the name of the user contact, the selectable element that is presented in the first state, and the indication of the quantity of the multiple notifications that have been generated for the first user contact; and (b) a name of a second user contact, a second selectable element that is presented in a second state that indicates a status level of a second prioritized notification generated for the second user contact, and an indication of a second quantity of second multiple notifications that have been generated for the second user contact.

6. The computer-implemented method of claim 5, wherein:

the presentation of the selectable element in the first state includes presenting the selectable element with a first color;

the presentation of the second selectable element in the second state includes presenting the second selectable element with a second color;

the presentation of the indication of the quantity of the multiple notifications includes presenting a subscript or superscript number that corresponds to the quantity of the multiple notifications; and the presentation of the indication of the second quantity of the second multiple notifications includes presenting a subscript or superscript number that corresponds to the second quantity of the second multiple notifications.

7. The computer-implemented method of claim 5, wherein:

the contact list further concurrently presents, along with the information listed for the user contact and the second user contact:

(c) a name of a third user contact, accompanied with an absence of any selectable element at a location relative to the name of the third user contact that corresponds to locations of the selectable element and the second selectable element relative to the name of the user contact and the second user contact.

8. The computer-implemented method of claim 5, wherein:

the contact list concurrently presents:

(a) a first selectable reminder element that is presented with a first design that indicates a first level of urgency of a first reminder to contact the first user contact;

(b) a second selectable reminder element that is presented with a second design that indicates a second level of urgency of a second reminder to contact the second user contact.

9. The computer-implemented method of claim 8, wherein:

the first selectable reminder element and the second selectable reminder element have a same first shape; and the selectable element and the second selectable element have a same second shape that differs from the same first shape.

10. The computer-implemented method of claim 8, wherein;

presenting the first selectable reminder element with the first design that indicates the first level of urgency includes presenting the first selectable reminder element with a first color;

presenting the second selectable reminder element with the second design that indicates the second level of urgency includes presenting the second selectable reminder element with a second color;

the first selectable reminder element is accompanied in the contact list by an indication of a quantity of first multiple reminders to contact the first individual specified by the first user account; and the second selectable reminder is accompanied in the contact list by an indication of a quantity of second multiple reminders to contact the second individual specified by the second user account.

11. The computer-implemented method of claim 1, wherein the second user interface comprises a pop-up box presented over the first user interface.

12. The computer-implemented method of claim 1, wherein:

the list of notifications presented by the second user interface includes:

(a) the prioritized notification accompanied by a graphical element presented in the first state that indicates the status level of the prioritized notification; and (b) a second notification of the multiple notifications accompanied by the graphical element presented in a second state that indicates the status level of the second notification.

13. The computer-implemented method of claim 12, wherein:

presenting the graphical element in the first state comprises presenting the graphical element with a first color; and presenting the graphical element in the second state comprises presenting the graphical element with a second color.

14. The computer-implemented method of claim 12, wherein:

presenting the prioritized notification in the second user interface includes presenting text that provides a title for the prioritized notification and text that provides a description for the prioritized notification and that is smaller than the text that provides the title for the prioritized notification; and presenting the second notification in the second user interface includes presenting text that provides a title for the second notification and text that provides a description for the second notification and that is smaller than the text that provides the title for the second notification.

15. The computer-implemented method of claim 12, wherein:

the second user interface presents a name of the first user contact and a second selectable element that is user selectable to cause the user device to navigate from presenting the second user interface to presenting a contact record for the first user contact.

16. The computer-implemented method of claim 1, wherein:

presenting the prioritized notification in the second user interface includes presenting:

(i) text indicating that a plan in which the first user contact is enrolled is or will no longer be available; and (ii) a second selectable element that is user selectable to cause the computing device to navigate from presenting the second user interface to presenting an interface to initiate a search for plans that are available for the first user contact.

17. The computer-implemented method of claim 1, wherein:

the prioritized notification has the highest priority level from among the priority levels assigned to the multiple notifications despite the prioritized notification be generated for the first user contact after at least one of the multiple notifications and before at least another of the multiple notifications, such that the prioritized notification is associated with neither a earliest date or most recent date from dates associated with the multiple notifications.

18. A computing system comprising:

one or more processors; and one or more computer-readable devices including instructions that, when executed by the one or more processor, cause the computing system to perform operations that include:

receiving, by the computing system, a request from a user device to present information regarding a first user contact;

identifying, by the computing system, multiple notifications generated for the first user contact, each notification of the multiple notifications assigned a priority level for the respective notification from a collection of different priority levels for notifications;

determining, by the computing system, a prioritized notification from among the multiple notifications generated for the first user contact, based on the priority level assigned to the prioritized notification having a highest priority level from among the priority levels assigned to the multiple notifications;

identifying, by the computing system, a quantity of the multiple notifications that have been generated for the first user contact;

providing, by the computing system responsive to the computing system receiving the request from the user device to present information regarding the first user contact, data to cause the user device to display a user interface that presents:

(i) a name of the first user contact;

(ii) a selectable element presented in a first state that indicates the status level of the prioritized notification, that is accompanied by an indication of the quantity of the multiple notifications that have been generated for the first user contact, and that is presented in a different color responsive to the computing system determining that prioritized notification has a different priority level from among the priority levels assigned to the multiple notifications;

providing, by the computing system, data to cause the user device to present the multiple notifications generated for the first user contact in a second user interface, responsive to the user device receiving user input that selects the selectable element, the second user interface presenting a list the notifications that includes:

(i) the prioritized notification at a beginning of the list of notifications, as a result of the prioritized notification having been determined by the computing system to have the highest priority level from among the priority levels assigned to the multiple notifications, the prioritized notification presented with text that provides a title for the prioritized notification and text that provides a description for the prioritized notifications and that is smaller than the text that provides the title for the prioritized notification; and (ii) other notifications of the multiple notifications following the prioritized notification, wherein at least one other notification is presented with text that provides a title for the at least one other notification and text that provides a description for the at least one other notification and that is smaller than the text that provides the title for the at least one other notification.

19. The system of claim 18, wherein:

the presentation of the selectable element in the first state comprises presenting the selectable element with a first color; and the computing system is configured to provide data to cause the user device to present the selectable element with a second color instead of the first color, responsive to the computing system determining that prioritized notification has a different priority level from among the priority levels assigned to the multiple notifications.

20. The system of claim 18, wherein:

the presentation of the indication of the quantity of the multiple notifications comprises presenting a number that is smaller than the selectable element next to the selectable element, the number corresponding to the quantity of the multiple notifications.

* * * * *